(12) United States Patent
Chung et al.

(10) Patent No.: US 12,168,256 B2
(45) Date of Patent: Dec. 17, 2024

(54) METHODS FOR FABRICATING METAL ARTICLES BY ADDITIVE MANUFACTURING

(71) Applicant: BOARD OF TRUSTEES OF MICHIGAN STATE UNIVERSITY, East Lansing, MI (US)

(72) Inventors: Haseung Chung, Ann Arbor, MI (US); Patrick Kwon, Okemos, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 0 days.

(21) Appl. No.: 17/726,733

(22) Filed: Apr. 22, 2022

(65) Prior Publication Data

US 2022/0339704 A1  Oct. 27, 2022

Related U.S. Application Data

(60) Provisional application No. 63/178,787, filed on Apr. 23, 2021.

(51) Int. Cl.
*B22F 10/12* (2021.01)
*B22F 10/73* (2021.01)
(Continued)

(52) U.S. Cl.
CPC .............. *B22F 10/12* (2021.01); *B22F 10/73* (2021.01); *B29C 64/165* (2017.08);
(Continued)

(58) Field of Classification Search
CPC ...... B22F 10/12; B22F 10/73; B22F 2304/10; B29C 64/165; B29C 64/314; B29C 64/357; B33Y 10/00; B33Y 30/00; B33Y 40/10
See application file for complete search history.

(56) References Cited

U.S. PATENT DOCUMENTS 5,143,663 A * 9/1992 Leyden .................. B33Y 40/20
34/189
2017/0348770 A1  12/2017 Kwon
(Continued)

OTHER PUBLICATIONS

Waqas Ahmed Sarwar, et. el. "Optimized Zirconia 3D Printing Using Digital Light Processing with Continuous Film Supply and Recyclable Slurry System" Materials 2021, 14, 3446 (Year: 2021).*
(Continued)

*Primary Examiner* — Brian D Walck
*Assistant Examiner* — Nazmun Nahar Shams
(74) *Attorney, Agent, or Firm* — MARSHALL, GERSTEIN & BORUN LLP

(57) ABSTRACT

The disclosure relates to a method for forming a metal article by additive manufacturing and related apparatus for performing the method. A metal particle suspension including a UV-curable polymeric resin liquid medium, and metal particles distributed throughout the liquid medium is deposited and cured by spatially selective exposure to UV radiation in a layer-by-layer process. Metal particle size can be selected in combination with the applied layer thickness to ensure complete cure throughout the applied layer while providing a high print speed and high spatial resolution. Intermittent or periodic partial curing of an applied layer can be used to maintain a homogeneous distribution of metal particles in the applied layer prior to full curing. The final product is achieved after sintering, which removes the cured binder in a debinding step and also provides the desired final article at close to the full density.

20 Claims, 5 Drawing Sheets

(51) Int. Cl.
    *B29C 64/165*     (2017.01)
    *B29C 64/314*     (2017.01)
    *B29C 64/357*     (2017.01)
    *B29K 505/00*     (2006.01)
    *B33Y 10/00*     (2015.01)
    *B33Y 30/00*     (2015.01)
    *B33Y 40/10*     (2020.01)

(52) U.S. Cl.
    CPC .......... *B29C 64/314* (2017.08); *B29C 64/357* (2017.08); *B33Y 10/00* (2014.12); *B33Y 30/00* (2014.12); *B33Y 40/10* (2020.01); *B22F 2304/10* (2013.01); *B29K 2505/00* (2013.01)

(56) References Cited

U.S. PATENT DOCUMENTS

2018/0326480 A1* 11/2018 Opschoor .............. B33Y 10/00
2020/0070242 A1* 3/2020 Opschoor .............. B22F 3/1017

OTHER PUBLICATIONS

Roumanie Maryline [EP3473356A1] (machine translation) (Year: 2019).*

Muslim Mukhtarkhanov, et al. "Application of Stereolithography Based 3D Printing Technology in Investment Casting Micromachines", 2020, 11, 946. (Year: 2020).*

H. Nguyen et al., "Development of an Innovative, High Speed, Large-Scaled, and Affordable Metal Additive Manufacturing Process," *CIRP Annals—Manufacturing Technology* 69:177-180 (May 18, 2020).

H. Nguyen et al., "Development of an Innovative, High Speed, Large-Scaled, and Affordable Metal Additive Manufacturing Process," CIRP Video Paper Sessions 2020 (May 18, 2020).

H. Nguyen et al., "Development of New Additive Manufacturing System Using Laser Based Digital Light Processing (DLP)," International Symposium on Precision Engineering and Sustainable Manufacturing (PRESM2018), Sapporo, Japan (Jul. 3-7, 2018).

* cited by examiner

METHODS FOR FABRICATING METAL ARTICLES BY ADDITIVE MANUFACTURING

CROSS REFERENCE TO RELATED APPLICATION

Priority is claimed to U.S. Provisional Application No. 63/178,787 filed on Apr. 23, 2021, which is incorporated herein by reference in its entirety.

STATEMENT OF GOVERNMENT INTEREST

None.

BACKGROUND OF THE DISCLOSURE

Field of the Disclosure

The disclosure relates to a method for forming a metal article by additive manufacturing and related apparatus for performing the method. A metal particle suspension including a UV-curable polymeric resin liquid medium, and metal particles distributed throughout the liquid medium is deposited and cured by spatially selective exposure to UV radiation in a layer-by-layer process. Metal particle size can be selected in combination with the applied layer thickness to ensure complete cure throughout the applied layer while providing a high print speed and high spatial resolution.

Brief Description of Related Technology

Current metal additive manufacturing (AM) processes and systems are limited to produce relatively small scaled parts for low production. Binder jet printing (BJP) and powder bed fusion (PBF) processes such as selective laser melting (SLM) and electron beam melting (EBM) are notably difficult to scale up in terms of part size and productivity as the energy source or binder injection must cover a large area. Directed energy deposition (DED) processes, despite having the capability to produce large parts, lack the accuracy and resolution to fabricate fine features within strict design tolerance.

Metal stereolithography (SLA) process has the potential to produce large parts at a high fabrication speed, thanks to its ability to quickly generate a 2D geometry by image projection, surpassing any point-by-point layer creation method. However, metal SLA is not currently a practical metal AM technique due to the difficulties in generating sufficient cure depth with metal suspensions and achieving high final part density. The feasibility of metal SLA has been evaluated for metal suspensions made of cobalt and aluminum powders in epoxy and acrylic resins. While parts with multilayers were fabricated, the achieved cure depth was between 5 and 20 mm, which made the processing time excessively long even for small parts. Sintering to a high density was difficult as oxidation behavior of aluminum prevented high temperature sintering, limiting part density to only 87%.

SUMMARY

In one aspect, the disclosure relates to a method for forming a metal article by additive manufacturing, the method comprising: providing a (well-mixed) metal particle suspension comprising (i) a UV-curable polymeric resin liquid medium, and (ii) metal particles distributed throughout the liquid medium; applying a first layer of the metal particle suspension into a reservoir; exposing a selected portion of the first layer to UV radiation for a sufficient time to cure the UV-curable polymeric resin in the liquid medium of the selected portion of the first layer, thereby forming a cured first layer comprising a first solid polymer layer in the selected portion with the metal particles distributed throughout the first solid polymer layer; applying a subsequent (e.g., second, third, . . . ) layer of the metal particle suspension into the reservoir and on a cured underlying layer; exposing a selected portion of the subsequent layer to UV radiation for a sufficient time to cure the UV-curable polymeric resin in the liquid medium of the selected portion of the subsequent layer, thereby forming a cured subsequent layer comprising a subsequent solid polymer layer in the selected portion with the metal particles distributed throughout the subsequent solid polymer layer; and repeating application and curing of a subsequent layer of the metal particle suspension a plurality of times to form a plurality of cured subsequent layers and subsequent solid polymer layers, thereby forming a green part comprising the solid polymer layers with the metal particles therein.

The reservoir can include a print bed, for example on a height-adjustable support surface therein or a previously applied and cured layer therein. The reservoir, print bed, and corresponding height-adjustment apparatus can include various top-down or bottom-up apparatus usable in metal stereolithography (SLA) processes. Exposing of selected portions of a given layer to UV radiation can be performed using a digital light projection (DLP) apparatus or module to irradiate a selected or controlled region or geometry (e.g., programmed or stored selections in computer or memory components associated with the DLP module) of the layer to UV irradiation. The shape of the solid polymer layer formed after exposure to UV radiation generally corresponds to the shape of the irradiated selected portion, where the non-irradiated portion of a layer is in a non-solid form (or non-fully cured form such as a liquid, gel, or semi-solid). Application of subsequent (e.g., second, third, . . . ) layers of the metal particle suspension is typically over or on the solid polymer portion and the non-solid portion of the previously applied layer (e.g., the first layer or the previous subsequent layer). The green part formed as a product of the method can include the first and all subsequent solid polymer layers as a composite green part article having a pre-selected overall shape/geometry based on the shape of the individual layers, with the metal particles being substantially homogeneously distributed throughout the polymer layers.

Various refinements of the disclosed method are possible.

In a refinement, the method further comprises: separating the green part from non-solid portions of the first layer and the subsequent layers. The non-cured or non-irradiated portions of the first and subsequent layers are generally in a non-solid or non-fully cured form, for example a liquid, a gel, or semi-solid form with the metal particles therein. When the non-cured or non-irradiated portions are substantially in liquid form, the solid green part can simply be withdrawn from the reservoir, optionally with some rinsing and/or drying to remove any residual UV-curable polymeric resin liquid medium and non-bound metal particles thereon (i.e., metal particles not bound or otherwise immobilized by a cured polymeric matrix). When the non-cured or non-irradiated portions are substantially in gel or semi-solid form, the solid green part can be separated therefrom by wiping or otherwise mechanically removing a partially cured polymeric material and non-bound metal particles, washing or rinsing the solid green part with a suitable solvent for the partially cured or uncured material (but which would not be able to dissolve or otherwise remove the fully cured/crosslinked thermoset material forming the solid layer portions of the green part).

In a refinement, the method further comprises: recovering (and recycling) metal particles from the non-solid portions of the first layer and the subsequent layers. In some embodiments, the non-fully cured portions of the polymer and metal particle mixture that are removed from the green part can be further processed to separate and recover the metal particles therein, which in turn allows recycling and reuse of the metal particles in the printing of a new, different metal article. For example, a suitable (organic) solvent (e.g., isopropanol or other lower C1-C4 alcohol) can be used to solvate/dissolve the non-fully cured polymer (i.e., which has not been fully cured to an insoluble thermoset), thus allowing the metal particles therein to settle and be collected.

In a refinement, the method further comprises: heating the green part to a temperature sufficient to (i) remove the solid polymer layers (i.e., a thermal debinding step), and (ii) partially, but not fully, sinter the metal particles, thereby forming a pre-sintered part comprising pre-sintered metal particles in the shape of the green part; and heating the pre-sintered part to a temperature sufficient to sinter (e.g., fully sinter or fuse) the metal particles, thereby forming a sintered part comprising sintered metal particles in a reduced-volume shape of the green part. The final metal article having a desired shape as a product of the additive manufacturing process is generally formed by heating to remove the cured (or crosslinked/thermoset) portion of the green part and to partially sinter the metal particles in the green part in a first debinding step. Debinding generally includes applying heat and/or pressure a level and time sufficient to partially fuse (e.g., but not fully fuse or sinter) the metal particle/powder components of the green composition without substantial melting or liquid phase formation (e.g., necking or neck formation). Debinding can be performed in air or under an inert gas atmosphere (e.g., argon atmosphere) in order to avoid oxidation of the composition components during debinding. Debinding is suitably performed at a temperature sufficient to decompose/eliminate the cured polymeric binder from the green part model. After debinding, the green part is sintered in a second step to form the final metal article by applying heat and/or pressure a level and time sufficient to fuse the metal particle/powder components of the green composition without substantial melting.

Debinding is performed at a temperature sufficient to decompose/eliminate the cured binder from the model, but less than a temperature sufficient to fully sinter the model. Depending on the material used for the polymeric resin, a debinding step to remove the cured polymer (or a debinding step) can be performed at a temperature in a range from 300° C. to 700° C. (e.g., 350-600° C. or 400-500° C.), for example at a temperature that is at least 200° C., 300° C., or 400° C. and/or up to 600° C., 800° C., or 1000° C. less than the eventual sintering temperature. At such decomposition temperatures, partial sintering of some metal particles occurs to a degree sufficient to maintain the shape of the debinded part even in the absence the cured binder (albeit at a low density and with low tensile strength properties), which allows the debinded part to be subsequently fully sintered at higher temperatures. The debinded part typically has the same overall shape and dimensions as the original green part, for example having characteristic linear dimensions in all three coordinate directions of at least 0.95, 0.98, or 0.99 and/or up to 0.98, 0.99, or 1 times that of the original green part.

Depending on the material used for the metal particles, the sintering step can be performed at a temperature in a range from 1000° C. to 1600° C. (e.g., 1000-1400° C., 1100-1300° C. or 1150-1250° C.). The sintered part typically has a reduction in volume that result in substantially the same shape as the original green part (i.e., geometrically same or similar), but having smaller dimensions resulting from contraction upon sintering while filling in interstitial space among the metal particles. For example, the sintered part can have characteristic linear dimensions in all three coordinate directions (or a shrinkage value) between 0.6 and 0.8, such as at least 0.6, 0.65, 0.7, 0.75, 0.8, 0.85, or 0.9 and/or up to 0.75, 0.8, 0.85, 0.9, or 0.95 times that of the original green part. The disclosed method retains geometric similarity between the green part and the sintered part with a controlled or selected degree of contraction between the two parts (i.e., and thus the ability to form the final metal article with controlled, desired dimensions) based on a well-mixed and homogeneous distribution of metal particles in the as-applied metal particle suspension, which in turn provides a homogeneous distribution of metal particles in the individual cured layers and green part. Given a homogeneous distribution of metal particles in the green part, the skilled artisan can determine using routine skill the relative contraction that will occur in all three coordinate directions upon sintering, thus allowing selection of an initial green part with shape and dimensions that will yield a sintered part with the desired shape and dimensions.

In a further refinement, the sintered part has a density of at least 70% or 80% relative to the theoretical density of the metal particles in the metal particle suspension. The theoretical density of the metal particles in the metal particle suspension is the density of a continuous, non-porous sample of the particle or other solid material in the initial metal particle suspension, for example taking into account multiple different types of metal particles, a possible boron-containing sintering aid, etc. In various embodiments, the sintered part can have a density of at least 70, 80, 85, 90, 95, or 98% and/or up to 90, 95, 98, 99, 99.5, or 100% of the theoretical density of the metal or otherwise solid material content initially in the metal particle suspension.

In a refinement, the method further comprises: after applying the first layer and before exposing the selected portion of the first layer to UV radiation, exposing the first layer to UV radiation for a sufficient time to partially cure the UV-curable polymeric resin in the liquid medium of the first layer, thereby forming a partially cured first layer comprising a first partially cured polymer layer with the metal particles distributed throughout the first partially cured polymer layer; and after applying each subsequent layer and before exposing the selected portion of each subsequent layer to UV radiation, exposing each subsequent layer to UV radiation for a sufficient time to partially cure the UV-curable polymeric resin in the liquid medium of each subsequent layer, thereby forming a partially cured subsequent layer comprising a subsequent partially cured polymer layer with the metal particles distributed throughout the subsequent partially cured polymer layer.

The partially cured (intermediate) state generally does not have the networked or thermoset character of the fully cured, solid polymer formed by further UV exposure in only the selected portion of a given layer. Partial curing begins the polymerization process among monomers of the UV-curable polymeric resin, but only to a limited extent such that the partially cured layer is substantially entirely in a non-solid or non-fully cured form, for example an increased viscosity liquid or gel/semi-solid form, for example including a mixture of (i) uncured or lightly cured components in liquid or semi-liquid form and (ii) partially cured components solid or semi-solid form. In contrast to the fully cured polymer, which is essentially completely solid material (e.g., by weight), the partially cured resin typically includes at least some liquid materials and at least some solid materials. Partial curing can begin to create some polymer chains, but the UV-curable polymeric resin can retain at least some of its liquid character, but with an increased viscosity relative to the initial viscosity of the UV-curable polymeric resin in the as-applied metal particle suspension. By increasing the viscosity of the liquid medium in the partially cured layer, the settling velocity of metal particles in suspension is substantially reduced, thereby helping to maintain a homogeneous, well-mixed distribution of the metal particles in suspension, which in turn provides a homogeneous distribution of the metal particles in the eventual solid polymer layers and corresponding green part. Continuing the partial cure can increase the length and/or number of polymer chains, gradually forming a gel or semi-solid material that further limits settling velocity throughout the entire partially cured layer, but which is still easily removed from the eventual fully cured green part. Forming a gel or semi-solid material that is not fully cured also allows the ability to form overhang structures in which a newly applied layer is to have a selected portion and corresponding solid polymer layer that is larger than or is otherwise not directly supported underneath by the previous solid polymer layer, because the gel or semi-solid material from the previous layer is sufficient to support the newly applied layer.

Partial curing can be effected by using lower UV exposure times and/or lower UV exposure power/energy levels relative to those for full or complete curing. For example, partial curing can be performed by exposure to UV light for relatively short times depending on the mixture composition in terms of powder/particle size and powder/particle volume fraction, such as at least 0.1, 0.2, or 0.5 sec and/or up to 2, 5, 10, or 20 sec. Similarly, full curing can be performed by exposure to UV light for relatively longer times also depending on the mixture composition in terms of powder/particle size and powder/particle volume fraction, such as at least 10, 20, or 30 sec and/or up to 90, 180, 300, or 600 sec.

Suitably, partial curing is performed on substantially the entire (print) area of a given layer. For example, at least 80, 85, 90, 95, 98, or 99% and/or up 95, 98, 99, or 100% of the area of a given layer is partially cured before fully curing only a selected portion of the partially cured layer to form the corresponding solid polymer layer in the selected portion.

In a refinement, the UV radiation has a peak wavelength in a range of 315 nm to 405 nm. Move generally, the UV radiation can generally span wavelengths from 10 nm to 400 nm or 10 nm to 405 nm, for example including one or more peak wavelengths in a given wavelength range having a peak energy or radiation intensity. The various wavelengths and ranges can apply to UV radiation exposure during both partial and full curing steps. The UV radiation is typically applied by a UV lamp, such as a UV-mercury lamp or UV-LED, which can be incorporated into the DLP module. Example UV ranges suitable for various UV-curable polymeric resins can include UV-A radiation (e.g., 315-400 nm or 315-405 nm), UV-B radiation (e.g., 280-315 nm), and UV-C radiation (e.g., 100-280 nm). Examples of specific wavelengths associated with common UV sources include 365 nm, 385 nm, and 405 nm (e.g., where one or more wavelengths can be selectable with a given UV lamp or other UV source), for example where a selected wavelength corresponds to a peak or maximum energy/intensity of emitted UV radiation at the selected wavelength.

In a refinement, the metal particle suspension contains the metal particles in an amount in a range of 60 wt. % to 99 wt. % or 80 wt. % to 99 wt. %; and the metal particle suspension contains the UV-curable polymeric resin in an amount in a range of 1 wt. % to 20 wt. % or 1 wt. % to 20 wt. %. In various embodiments, the metal particle suspension can contain the metal particles in an amount of at least 60, 70, 75, 80, 85, 90, or 95 wt. % and/or up to 85, 90, 92, 95, 97, or 99 wt. %. In various embodiments, the metal particle suspension can contain the UV-curable polymeric resin in an amount of at least 1, 2, 5, 7, 10, 12, 15, or 20 wt. % and/or up to 8, 10, 12, 15, 20, 25, 30, or 40 wt. %. Alternatively or additionally, the metal particle suspension can be characterized in terms of the volume fraction of its components. For example, the metal particle suspension can contain 40-80 vol. % (or 50-65 vol. %) particles (e.g., all metal particles and any boron-containing particles combined) and/or 20-60 vol. % (or 35-50 vol. %) liquid medium (e.g., UV-curable polymeric resin). In various embodiments, the metal particles account for 90 wt. % to 100 wt. % of the solid content of the metal particle suspension (i.e., excluding the liquid resin medium), for example being at least 90, 95, 98, 99, 99.9 wt. % and/or up to 95, 98, 99, 99.9 or 100 wt. % of the solid content in the suspension.

In a refinement, the metal particles comprise iron-containing particles (e.g., iron-containing metallic alloy particles). The iron-containing particles or powder can include iron-containing metallic alloy particles. Typical iron-containing particles can contain at least 50, 60, 70, 80, 90, or 95 wt. % iron and optionally one or more of carbon, manganese, aluminum, chromium, copper, nickel, molybdenum, silicon, vanadium. Examples of suitable iron-containing particles include steel and stainless steel metal particles, for example stainless steels SS316 and SS420. In some embodiments, the metal particles can include two or more types of metal particles, for example those which differ in composition (e.g., different metal compositions, whether iron-containing or otherwise) and/or differ in particle size/size distribution. Other materials and alloys based on metals other than iron are also possible. For example, other materials can include nickel, tungsten, or cobalt as primary metallic alloy components (e.g., at least 50, 60, 70, 80, 90, or 95 wt. % of the primary metal component with one or more of the above optional components). Particular examples include nickel-based super alloys such as AMDRY 386 and HAYNES 214, tungsten alloys, cobalt alloys, and high entropy alloys (HEA).

In a refinement, the metal particle suspension further comprises (iii) boron-containing particles. The boron-containing particles can serve as a sintering aid to improve the density, hardness, and/or finish of the final, sintered part. The boron-containing powder can include one or more of elemental boron particles (e.g., particles consisting of essentially only boron), boron carbide (BC) particles, and boron nitride (BN) particles. Sintering aids other than boron-containing powders can be used depending on the metal particles being sintered. For example, boron-containing materials such as B or BN are particularly useful sintering aids for iron-based metal particles such as various stainless steels, while Pd, Ni, and/or Pt are particularly useful sintering aids for tungsten-based metal particles. The boron-containing powder or other sintering aid is present in an amount from 0.01 wt. % to 5 wt. % relative to the metal particle suspension or the solid content thereof, for example being at least 0.01, 0.1, 0.2, 0.5, or 0.8 wt. % and/or up to 1, 1.2, 1.5, 2, 3, 4, or 5 wt. % in the metal particle suspension or solid content thereof, such as 0.2 wt. % to 2 wt. %. In various embodiments, the metal particles and boron-containing particles (or other sintering aid) combined account for 60 wt. % to 90 wt. % or 100 wt. % of the solid content of the metal particle suspension (i.e., excluding the liquid resin medium), for example being at least 60, 70, 80, 90, 95, 98, 99, 99.9 wt. % and/or up to 90, 95, 98, 99, 99.9 or 100 wt. % of the solid content in the suspension.

In a refinement, the metal particles have a particle size in a range from 1 μm to 200 μm. A particle size or size range can represent an average size or diameter of a particle size distribution, for example a number-, mass-, or volume-average size or diameter. A particle size or size range can alternatively or additionally represent lower and upper boundaries of a size particle size distribution, for example minimum/maximum particles sizes resulting from sieve cuts, 1%/99% sizes from a cumulative size distribution, 5%/95% sizes from a cumulative size distribution, etc. For example, the particle size of the metal particles can be at least 1, 2, 5, 10, 15, 20, 30, 40, 50, or 60 μm and/or up to 10, 20, 30, 40, 50, 60, 80, 100, 120, 150, or 200 In some embodiments, the metal particle suspension can include two or more different types of metal particles having different size or size distribution characteristics (e.g., and being formed from the same or different materials). For example, two different types of metal particles can have average sizes (number-, mass-, or volume-average sizes) in a ratio ranging from 1.5:1 to 10:1 (e.g., at least 1.5:1, 2:1, or 3:1 and/or up to 3:1, 5:1, 8:1, or 10:1 with the first powder having the larger average size). In another refinement, the boron-containing particles have a particle size in a range from 0.01 μm to 20 μm (e.g., a number-, mass-, or volume-average size or diameter, such as at least 0.01, 0.1, 0.2, 0.5, or 1 μm and/or up to 1, 2, 3, 5, 10, or 20 μm, for example 0.1 μm to 3 μm or 0.2 μm to 2 μm). In another refinement, the metal particles and the boron-containing particles have average sizes (number-, mass-, or volume-average sizes) in a ratio in a range from 5:1 to 100:1 (e.g., at least 5:1, 10:1, 15:1, or 20:1, or 30:1 and/or up to 30:1, 50:1, 80:1, or 100:1 with the metal particles having the larger average size).

In a refinement, the UV-curable polymeric resin is selected from the group consisting of UV-curable polyesters, epoxies, urethanes, silicones, polyethers, and combinations thereof. More generally, there are a wide variety of UV-curable polymeric resin known in the art, and those that can be used in the disclosed method are not particularly limited. General examples include (meth)acrylic-functionalized oligomers that can undergo free-radical polymerization and curing upon exposure to UV radiation, for example (meth)acrylated polyesters, (meth)acrylated epoxies, (meth)acrylated urethanes, (meth)acrylated silicones, and (meth)acrylated polyethers, in particular (meth)acrylated oligomers of the foregoing. Suitably, the UV-curable polymeric resin is curable upon exposure to UV radiation, but without the need for additional additives such as catalysts, (photo)initiators, etc.

In a refinement, the liquid medium has a viscosity at 20° C. or 25° C. in a range of 5 cP to 100 cP. The liquid medium and (correspondingly) the metal particle suspension as initially provided and applied as a layer suitably has a relatively low viscosity, which helps to ensure sufficient and even recoating of the underlying (cured) layer upon application of a new (uncured) layer. As described above, partial curing of the initially applied low-viscosity fluid suspension can then increase viscosity and limit further settling within the evenly-applied layer. For example, the initial the UV-curable polymeric resin can have an initial viscosity in a range of 5-100 cP, 10-50 cP, or 10-20 cP, and/or the partially cured resin can have a viscosity that is at least 2, 4, 6, 10, 20, or 50 and/or up to 10, 20, 40, 60, 80, 100, 200, or 500 times the initial viscosity. The viscosity values can be measured at 20° C. or 25° C. with a suitable rheometer.

In a refinement, the applied first layer has a thickness in a range of 10 μm to 500 μm; and/or each applied subsequent layer has a thickness in a range of 10 μm to 500 μm. In various embodiments, the applied layers can have the same or different thicknesses relative to each other. For example, each applied layer independently can have a thickness of at least 10, 20, 30, 40, 50, 60, 80, 100, 120, 150, or 200 μm and/or up to 50, 75, 100, 125, 150, 200, 250, 300, 400, or 500 μm. Likewise, the applied layers can have metal particles with the same or different sizes/size distributions relative to each other. Often, the layer thickness will be determined and selected by curing depth and dimensional accuracy in view of the final desired article to be manufactured. Once a metal particle suspension composition is selected for the final article, the layer thickness is typically selected to be a fixed, consistent value throughout the process for a given article. The thickness between successive layers can be varied if desired, however, for example to provide structures with finer/smaller geometric scales in certain areas of the final article.

The thickness of a given layer is generally selected based on the size/size distribution of the metal particles in the applied metal particle suspension as well as the desired spatial resolution of the eventual green part. A larger layer thickness, for example at least 20 μm or 50 μm can be desirable to improve print speed by lessening the number of layers required to print a green part with a given total height. The thickness of a layer is limited, however, by the size/size distribution of the metal particles in the applied suspension: Relatively smaller metal particles generally increase scattering of UV radiation, thus limiting the ability of the UV radiation to penetrate past a certain distance within a layer while maintaining sufficient energy to initiate and cure the UV-curable polymeric resin. Thus, a maximum cure depth (or equivalently, a maximum layer thickness) is generally directly proportional to metal particle size: Smaller particles have more scattering and lower cure depths, while larger particles have less scattering and higher cure depths. As a counter to the scattering effect, the undesirable settling of metal particles in a layer after application increases with increasing size: Larger particles settle relatively more rapidly than smaller particles, possibly leading to an inhomogeneous, segregated spatial distribution of metal particles before full curing, which in turn results in an inhomogeneous metal particle distribution in the eventual green part and a misshapen final sintered part. This settling inhomogeneity for relatively larger particles is more pronounced in relatively thicker layers.

The competing effects between cure depth, layer thickness, and particle inhomogeneity are relatively pronounced for metal particles, meaning that additive manufacturing methods using a UV-curable binder for ceramic particle suspensions are not applicable to methods with metal particle suspensions. Ceramic particles are typically less dense and smaller (e.g., about 1 μm average size/diameter), but do not limit cure depth with such intense light scattering, meaning that thicker layers of ceramic particle suspensions can be applied without any appreciable sedimentation or segregation. In contrast, however, final sintered ceramic articles generally have a much lower density (e.g., up to about 90% maximum relative to theoretical density) than the final sintered metal articles according to the disclosure. The disclosed method for forming metal articles by additive manufacturing solves the problems with metal particle suspensions such that metal particle size and maximum cure depth/layer thickness are more freely selectable or controllable within larger ranges without substantial settling or segregation to cause metal particle inhomogeneity. Two means to address these problems include pre-mixing the metal particle suspension just prior to its application print bed, and partially curing the UV-curable polymeric resin of the full layer prior to full curing of only a selected portion of the layer. As a result, the disclosed method allows selection of relatively high metal particle sizes for correspondingly higher cure depths and layer thicknesses to increase printing speed. At the same time, the disclosed method also allows selection of relatively low metal particle sizes for correspondingly lower cure depths and layer thicknesses, which allows for finer spatial resolution for geometric features of the printed article (albeit at lower printing speeds for the higher-resolution parts or areas thereof).

In a refinement, at least one of the applied first layer and each applied subsequent layer has a thickness in a range of 50 μm to 100 μm; and the metal particles have a particle size in a range of 2 μm to 30 μm (or 5 μm to 20 μm).

In a refinement, at least one of the applied first layer and each applied subsequent layer has a thickness in a range of 100 μm to 200 μm; and the metal particles have a particle size in a range of 15 μm to 80 μm (or 20 μm to 60 μm).

In a refinement, at least one of the applied first layer and each applied subsequent layer has a thickness in a range of 200 μm to 500 μm; and the metal particles have a particle size in a range of 30 μm to 200 μm (or 40 μm to 100 μm).

In a refinement, providing the metal particle suspension comprises: mixing (i) the UV-curable polymeric resin, (ii) the metal particles, and optionally (iii) boron-containing particles in a mixer to form and homogenize the metal particle suspension just prior to application of the metal particle suspension as the first layer and each subsequent layer. The mixer can be any suitable mixing apparatus, for example including an agitator, a dispensing outlet for the metal particle suspension, an inlet from a reservoir for particles (e.g., metal particles and optionally boron-containing particles), and an inlet from a reservoir for the UV-curable polymeric resin liquid medium. The mixer can continuously mix its contents so that the metal particle suspension is a homogenous, well-mixed suspension at the point when the suspension is applied as a layer in the print bed, for example being applied as a layer on a deposition area/surface, whereupon the layer is rolled, pushed, or otherwise transported to the adjacent print bed. This process reduces the amount of time available for metal particle settling in the applied layers before curing (or partial curing). For example, the mixture can be dispensed on the deposition surface so that it can be spread into a layer with a selected and consistent thickness (e.g., corresponding to the eventual layer in the reservoir), whereupon a scraper/roller or other suitable apparatus can be used to essentially immediately deliver the dispensed material on the deposition surface to the build surface in the reservoir.

In another aspect, the disclosure relates to an additive manufacturing apparatus for forming a metal article, the apparatus comprising: a print bed reservoir (e.g., having a height-adjustable print bed surface such as for a top-down printing additive manufacturing process); a UV light source (e.g., UV LED) adapted to transmit UV light in a selectable pattern into the print bed reservoir (e.g., a digital light projector (DLP) module capable of irradiating the entire area or a specifically selected portion thereof within the print bed reservoir); a first reservoir adapted to contain metal particles therein and deliver the metal particles therefrom; a second reservoir adapted to contain a UV-curable polymeric resin liquid therein and deliver the UV-curable polymeric resin liquid therefrom; a mixer that is (i) in communication with and adapted to receive the metal particles from the first reservoir, (ii) in communication with and adapted to receive the UV-curable polymeric resin liquid from the second reservoir, (iii) adapted to mix the metal particles and the UV-curable polymeric resin liquid to form a metal particle suspension therein, and (iv) adapted to apply the metal particle suspension to the print bed reservoir in successive layers (e.g., via an intermediate deposition surface and roller). In a refinement, the apparatus further comprises: a computer system comprising a microprocessor, memory, and software adapted to control the additive manufacturing apparatus and form a green part therein (e.g., according to the foregoing methods, such as can be programmed into the computer system). The additive manufacturing apparatus can be used to perform the disclosed method for forming a metal article by additive manufacturing in any of its variously disclosed aspects, embodiments, refinements, etc.

While the disclosed articles, apparatus, methods, and compositions are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

DETAILED DESCRIPTION

Figure 1A:
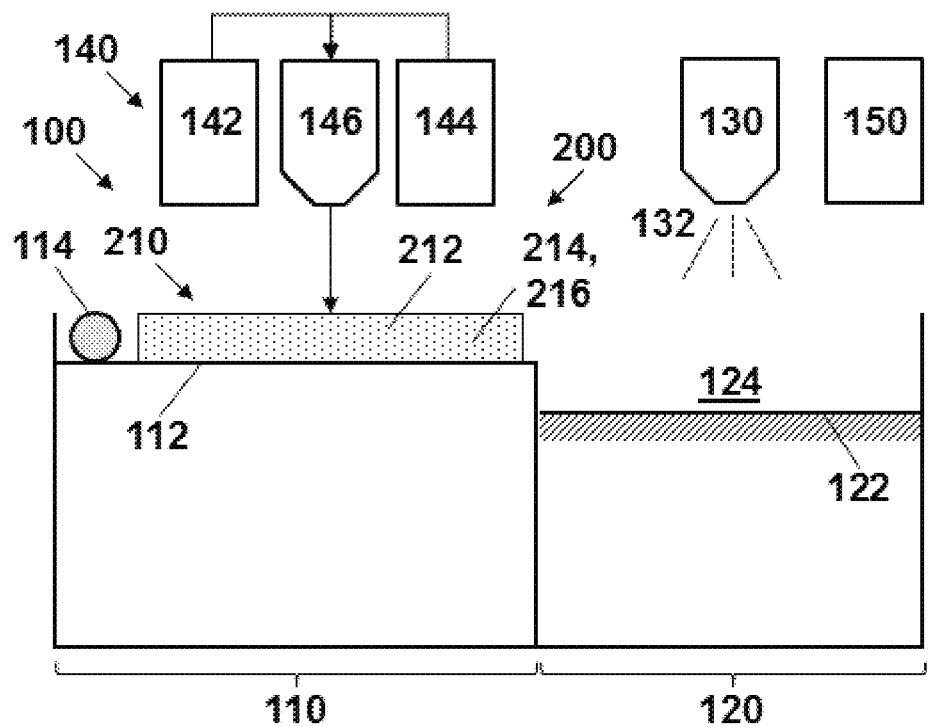
FIG. 1A is a side view illustrating an additive manufacturing apparatus and initial step in a corresponding additive manufacturing method for forming a metal article according to the disclosure.

The fabrication process of metal SLA includes photopolymerization of an ultraviolet (UV) curable metallic powder suspension in which a photopolymer is selectively cured from liquid to solid state, such that the selectively cured polymer holds the metal particles together and forms a desired geometry. The resin-metal matrix is then subjected to appropriate thermal treatments (e.g., pre-sintering and full sintering) to achieve the final solid object. A metal suspension for SLA process suitably has several properties: A sufficiently high particle loading in the suspension improves part quality, and minimizing the photopolymer resin content in the suspension to prevent defects during debinding and sintering and to obtain a dense and homogeneous final part. The suspension suitably has an appropriately low viscosity level in order to ensure good layer recoating (e.g., in application of subsequent layers in an AM process). Suspension stability is suitably maintained during the fabrication process to limit or prevent undesired segregation between metallic powder and photopolymer resin (i.e., which otherwise can result due to differing densities between the two materials). An appropriate cure depth is suitably achieved with short exposure time to ensure good interlayer adhesion and minimize fabrication time.

Ceramic materials have been successfully shaped into ceramic-based composite structures using SLA by mixing ceramic powders such as silica, silicon nitride, alumina, and hydroxyapatite with acrylate or epoxy resins. However, such methods are not directly applicable to the fabrication of metal parts using SLA due to multiple technical challenges: Sedimentation of metal particles in the suspension is difficult to prevent due to the significant density difference between metal powder and resin, whereas, in ceramic suspensions, the use of dispersing agent is sufficient to negate this effect. Such phenomenon has not been replicated for metal suspensions. As described in more detail below, the present method maintains a homogeneous or substantially homogeneous metal suspension during the AM process. Further, an effective cure depth (e.g., 100-200 μm) in metal suspensions has not been produced by previous method due to the predominance of light scattering and absorption. As described in more detail below, the disclosed method can significantly improve the cure depth of metal suspension, in particular by controlling or selecting metal particle size in the suspension, making metal SLA an excellent candidate to fabricate large parts in a high production environment. The disclosed method further can achieve very high relative densities (e.g., at least 95% or 97%) in the final sintered parts.

The disclosure relates to a method for forming a metal article by additive manufacturing and related apparatus for performing the method. A metal particle suspension including a UV-curable polymeric resin liquid medium, and metal particles distributed throughout the liquid medium is deposited and cured by spatially selective exposure to UV radiation in a layer-by-layer process. Metal particle size can be selected in combination with the applied layer thickness to ensure complete cure throughout the applied layer while providing a high print speed and high spatial resolution. Intermittent or periodic partial curing of an applied layer can be used to maintain a homogeneous distribution and limit or prevent sedimentation of metal particles in the applied layer prior to full curing.

The disclosed method addresses four main disadvantages of currently available metal additive manufacturing technologies: (1) small building platform, (2) slow printing speed, (3) not fully dense part, and (4) high price. By utilizing a digital light projection curing engine, the method allows for a high speed production of large scaled objects with high-resolution. The process uses a metal particle suspension, which is a mixture of photopolymer resin and metal powder. The composition of this mixture including the resin and various powders is varied depending on the properties and purpose of the final product. The entire layer down to a micron level of accuracy is cured by the projection, which allows a significant enhancement in processing/printing speed. Each layer is accumulated sequentially into the 3D solid made of powder mixture and cured resin as a green part. The final product is achieved after sintering in a high-temperature, material-dependent, and environment-controlled cycle. During this sintering process, not only is the cured resin phase is burned out in a debinding step, but also both solid and liquid state sintering among metallic powder are effectively controlled, which enables production of the final article at close to the full density, theoretical density of the metal material(s) used in the metal particle suspension.

An additive manufacturing system according to the disclosure can include a top-down powder bed design, in which a print bed is lowered by one-layer thickness until the part is completely printed. A conventional supply bed is replaced by a top down deposition system, which also serves as a mixing module. Pre-filling the build container with metal suspension will result in mixture segregation, which will negatively affect both the curability and structural integrity of green part. A mixing system can be employed to ensure the homogeneity of the suspension throughout the manufacturing process. The AM system generally functions as follows: (a) mixing module deposits a sufficient amount of the metal suspension for one layer into a deposition area while (constantly) mixing the suspension to maintain homogeneity, (b) a roller or blade pushes the suspension from the deposition area to the print bed, (c) a digital light projection (DLP) module or other UV light source projects and cures the desired pattern on each layer of the metal suspension in the print bed, (d) the print bed moves down by height equivalent to the next layer thickness, and (e) the process repeats until the 3D part is completed.

The suspension curing module is able to (a) create the thin metal suspension layer quickly on a large build area, (b) provide an adequate energy dosage for photopolymerization of the polymeric resin component of the metal suspension, and (c) ensure the uniformity of the thin metal suspension layer over a large print area. In most SLA systems, the two most common curing methods are laser scanning and DLP projection. A laser system ensures a sufficient curing power density, while maintaining a high resolution. However, on a large build platform, the use of a laser is inferior to an image projection module in term of processing speed, because the DLP module is able to irradiate, at one instance in time, the entire area of the metal suspension layer corresponding to the eventual (sintered/solidified) part structure for the layer. Moreover, the nature of the point-by-point layer creation of laser scanning and the constant segregation of powder and resin in the print bed will result in layer non-uniformity (i.e., points irradiated by the laser later in time relative to layer deposition are more non-uniform than points irradiated earlier in time relative to deposition). This effect will intensify on a large print bed due to (a) the extended time to scan the geometry with the laser, and (b) the deterioration of beam quality in the outer area on the print bed. Therefore, a DLP projection module is particularly suitable as the UV light source in the disclosed system.

FIGS. 1A-1J and FIGS. 2A-2C collectively illustrate an additive manufacturing apparatus 100 and a corresponding additive manufacturing method 200 for forming a metal article 300 according to the disclosure.

Additive Manufacturing Apparatus

As particularly illustrated in FIG. 1A, the illustrative additive manufacturing apparatus 100 generally can include a deposition area 110, a print area 120, a UV light source 130, a metal particle suspension delivery system 140, and a computer system 150. The deposition area 100 can be positioned relative to the metal particle suspension delivery system 140 so that it receives a selected amount of metal particle suspension 210, for example on a deposition surface 112, whereupon the metal particle suspension 210 can be delivered or otherwise applied to the print area 120, for example via a roller 114 or other suitable mechanical means. The print area 120 includes a print bed reservoir 124 with a print surface 122 for receiving the metal particle suspension 210, for example, in an amount corresponding to a desired layer thickness for a given surface area of the print surface 122. The print surface 122 can be a height-adjustable print bed surface such as typically used for a top-down printing additive manufacturing process, for example where the print surface 122 is initially in an upper or higher position and then travels downward to a lower relative position (e.g., relative to the deposition surface 112) during the additive manufacturing process.

The UV light source 130 (e.g., UV LED) is adapted to transmit UV light or radiation 132 in a selectable pattern into the print bed reservoir 124. The UV light source 130 is generally capable of irradiating the entire area or a specifically selected portion of the print bed reservoir 124, including the metal particle suspension 210 or layer 220 thereof. The UV light source 130 suitably can be a digital light projector (DLP) module. Suitable curing energy intensities for the UV light or radiation 132 can be in a range of 1 $mJ/cm^2$ to 10000 $mJ/cm^2$ or 10 $mJ/cm^2$ to 1000 $mJ/cm^2$, for example at least 1, 2, 5, 10, 20, 35, 50, 75, 100, 200, or 500 $mJ/cm^2$ and/or up to 30, 60, 90, 150, 200, 250, 300, 500, 700, 1000, 2000, 5000, or 10000 $mJ/cm^2$. Such ranges for energy intensity can apply to either or both of the full curing and optional partial curing steps.

In embodiments, the UV radiation 132 can generally span wavelengths from 10 nm to 400 nm or 10 nm to 405 nm, for example including one or more peak wavelengths in a given wavelength range having a peak energy or radiation intensity, such as a peak wavelength in a range of 315 nm to 405 nm. The various wavelengths and ranges can apply to UV radiation exposure during both partial and full curing steps. The UV radiation is typically applied by a UV lamp as the light source 130, such as a UV-mercury lamp or UV-LED, which can be incorporated into the DLP module. Example UV ranges (or peak wavelength ranges) suitable for various UV-curable polymeric resins can include UV-A radiation (e.g., 315-400 nm or 315-405 nm), UV-B radiation (e.g., 280-315 nm), and UV-C radiation (e.g., 100-280 nm). Examples of specific wavelengths associated with common UV sources include 365 nm, 385 nm, and 405 nm (e.g., where one or more wavelengths can be selectable with a given UV lamp or other UV source), for example where a selected wavelength corresponds to a peak or maximum energy/intensity of emitted UV radiation at the selected wavelength.

The metal particle suspension delivery system 140 can include a first reservoir 142, a second reservoir 144, and a mixer 146. The first reservoir 142 is a suitable vessel or container adapted to contain metal particles 214 (and optionally sintering aid particles 216 admixed therewith) therein and deliver the metal particles 214/sintering aid 216 therefrom. The second reservoir 144 is a suitable vessel or container adapted to contain a UV-curable polymeric resin liquid 212 therein and deliver the UV-curable polymeric resin liquid 212 therefrom. The mixer 146 is in (fluid) communication with and adapted to receive the metal particles 214/sintering aid 216 from the first reservoir 142, such as via suitable piping/tubing/pumping/conveying apparatus (not shown). The mixer 146 also is in (fluid) communication with and adapted to receive the UV-curable polymeric resin liquid 212 from the second reservoir 144, such as via suitable piping/tubing/pumping/conveying apparatus (not shown). The mixer 146 also is adapted to mix the metal particles 214, sintering aid 216 (when present), and the UV-curable polymeric resin liquid 212 to form the metal particle suspension 210 therein. For example, the mixer 146 can include an impeller, rotating wall, etc. to mix and homogenize the metal particle suspension 210, which can be delivered via suitable outlet piping/tubing/pumping/conveying apparatus (not shown). The mixer 146 is further positioned and adapted to apply the metal particle suspension 210 to the print bed reservoir 124 in successive layers, for example via the intermediate deposition surface 112 wherefrom the roller 114 delivers the suspension 210 as a layer 220 to the print surface 122.

In embodiments, the additive manufacturing apparatus 100 can further include the computer system 150. The computer system 150 generally can include one or more of a microprocessor, memory, and software adapted to control the additive manufacturing apparatus 100 and form a green part 310 therein according to any of the methods described herein, such as can be programmed into the computer system. Accordingly, the computer system 150 can be electronically connected (e.g., wired or wireless data/communication connections) to one or more of the UV light source 130, first reservoir 142, second reservoir 144, mixer 146, roller 114, print surface 122, and/or related motor, actuator, controller, etc. to perform and automate various steps in the additive manufacturing method 200.

Additive Manufacturing Method

In the illustrative additive manufacturing method 200, a metal particle suspension 210 including a UV-curable polymeric resin liquid medium 212, and metal particles 214 distributed throughout the liquid medium 212 is deposited and cured by spatially selective exposure to UV radiation 132 in a layer-by-layer process (e.g., sequential application and curing of a plurality of layers 220). FIG. 1A primarily illustrates the additive manufacturing apparatus 100, but it also illustrates an initial step in the layer-by-layer process in which the metal particle suspension 210 is deposited on the deposition surface 112, whereupon it can be delivered or otherwise applied to the print area 120, for example via a roller 114 or other suitable mechanical means.

Figure 1B:
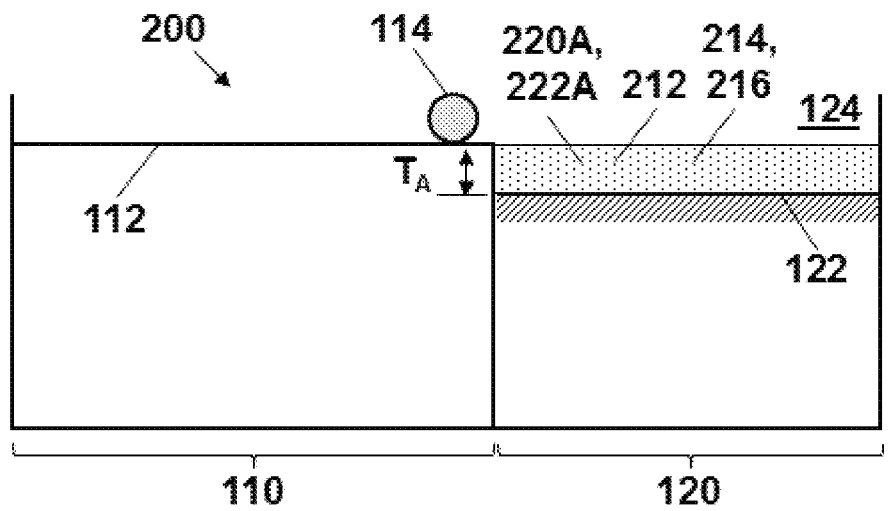
FIG. 1B is a side cross-sectional view illustrating a first step in an additive manufacturing method according to the disclosure (metal particle suspension layer).
Figure 1C:
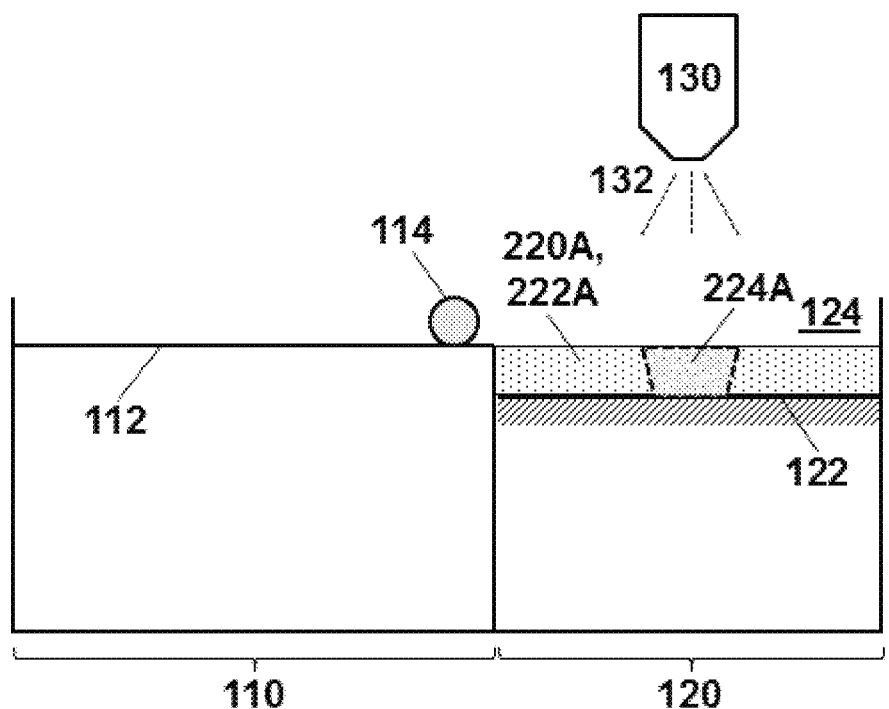
FIG. 1C is a side cross-sectional view illustrating a first step in an additive manufacturing method according to the disclosure (irradiating selected portion of suspension layer).
Figure 1D:
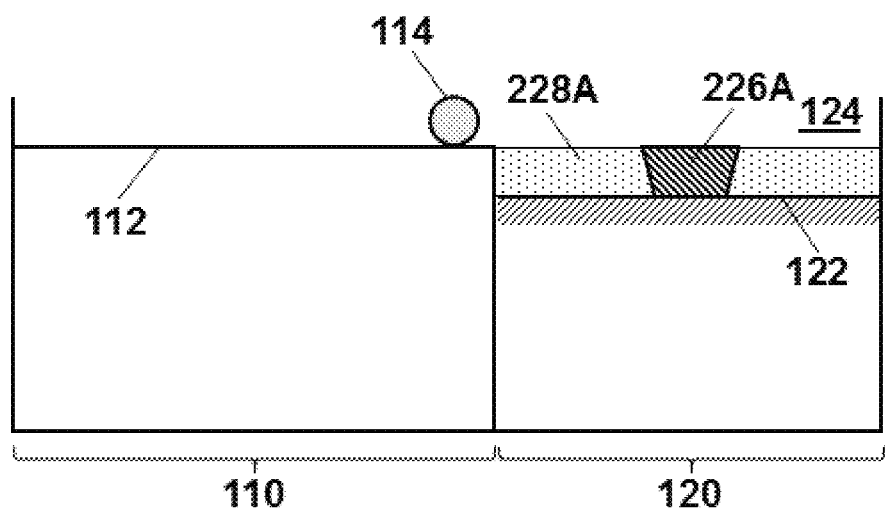
FIG. 1D is a side cross-sectional view illustrating a first step in an additive manufacturing method according to the disclosure (solid polymer layer).

FIGS. 1B-1D illustrate a first step in the additive manufacturing method 200. As illustrated in FIG. 1B, a first layer 220A with thickness $T_A$ of the metal particle suspension 210 is applied or delivered to the print reservoir 124 (e.g., via the roller 114), for example onto the print surface 122. As illustrated in FIG. 1O, a selected portion 224A of the first layer 220A is exposed to UV radiation 132 (e.g., via the UV light source 130). UV irradiation is performed for a sufficient time to cure the UV-curable polymeric resin in the liquid medium 212 of the selected portion 224A of the first layer 220A, thereby forming a cured first layer 226A. The cured first layer 226A includes both a first solid polymer layer or portion (i.e., the cured resin) in the selected portion 224A as a binder or matrix with the metal particles 214 distributed throughout the first solid polymer layer or portion of the cured first layer 226A. The shape of the cured first layer 226A and/or solid polymer layer formed after exposure to the UV radiation 132 generally corresponds to the shape of the irradiated selected portion 224A. The non-irradiated portion of the original layer 220A remains in a non-solid form or layer 228A, for example a uncured, partially cured, or non-fully cured form such as a liquid, gel, or semi-solid.

Figure 1E:
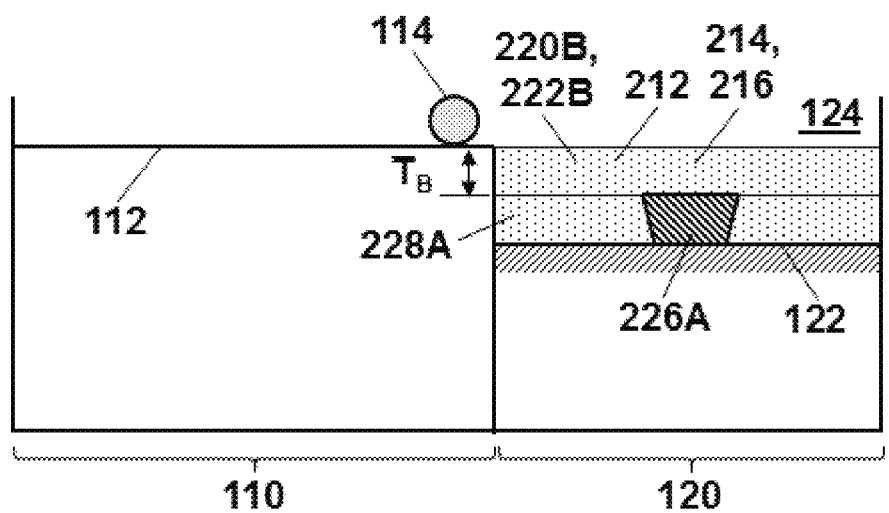
FIG. 1E is a side cross-sectional view illustrating a second step in an additive manufacturing method according to the disclosure (metal particle suspension layer).
Figure 1F:
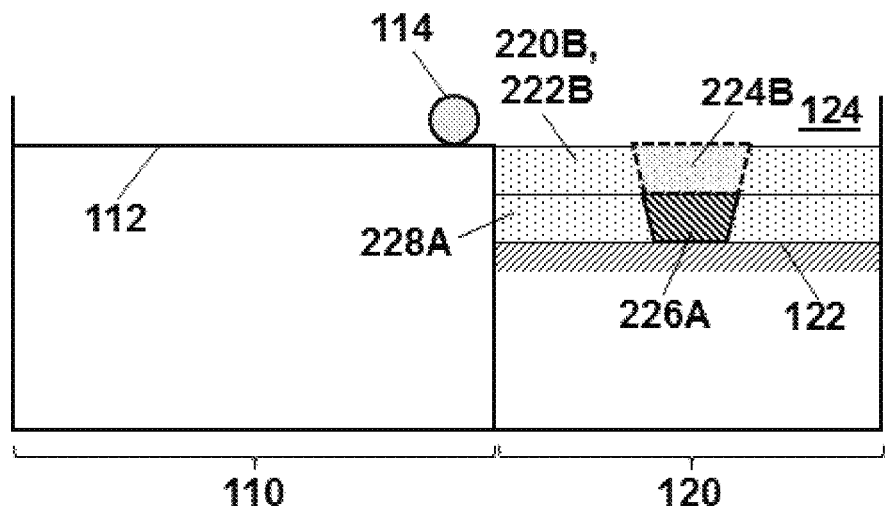
FIG. 1F is a side cross-sectional view illustrating a second step in an additive manufacturing method according to the disclosure (irradiating selected portion of suspension layer).
Figure 1G:
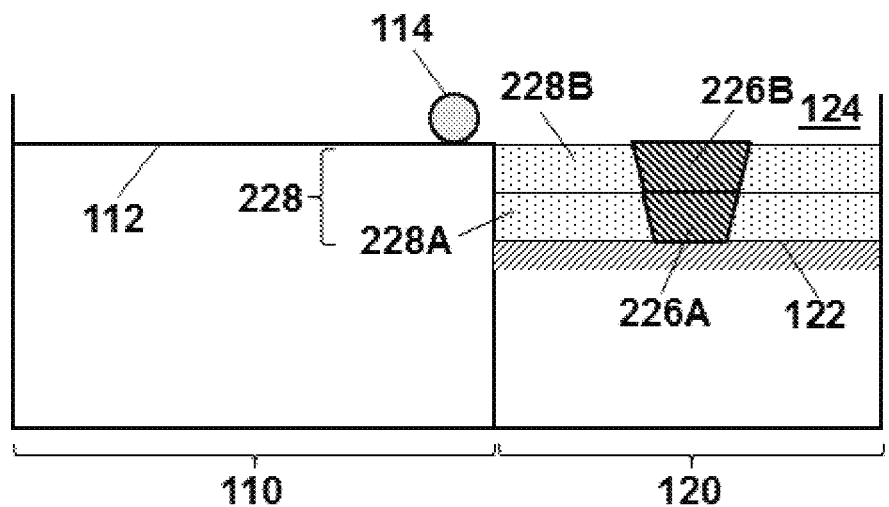
FIG. 1G is a side cross-sectional view illustrating a second step in an additive manufacturing method according to the disclosure (solid polymer layer).

FIGS. 1E-1G illustrate a second step in the additive manufacturing method 200 analogous the first step discussed above. The print surface 122 along with the cured first layer 226A and non-solid first layer 228A are lowered to provide space for application of a second layer 220B with thickness $T_B$ of the metal particle suspension 210 to the print reservoir 124 (e.g., via the roller 114) and onto the underlying cured first layer 226A and non-solid first layer 228A (FIG. 1E). Irradiation and curing of a selected portion 224B of the second layer 220B then forms a corresponding cured second layer 226B (i.e., with the solid polymer matrix and metal particles therein) and non-solid second layer 228B (FIGS. 1F-1G).

Figure 1H:
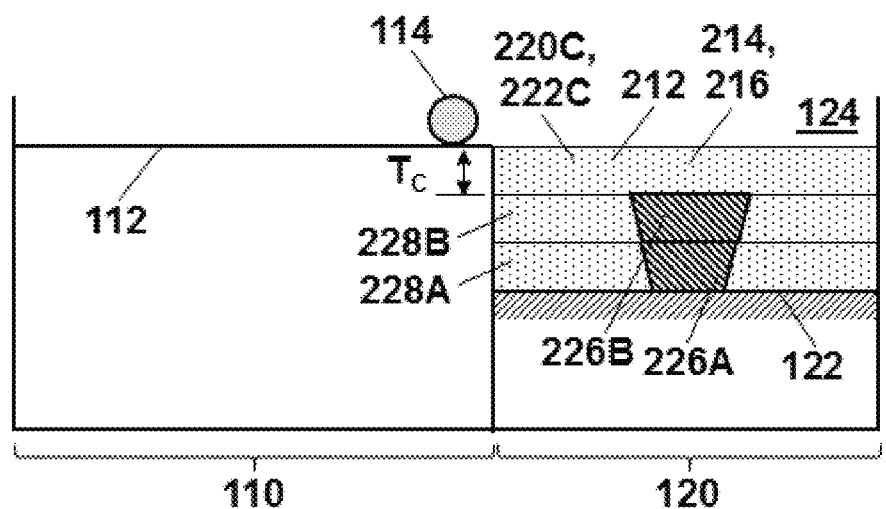
FIG. 1H is a side cross-sectional view illustrating a third step in an additive manufacturing method according to the disclosure (metal particle suspension layer).
Figure 1I:
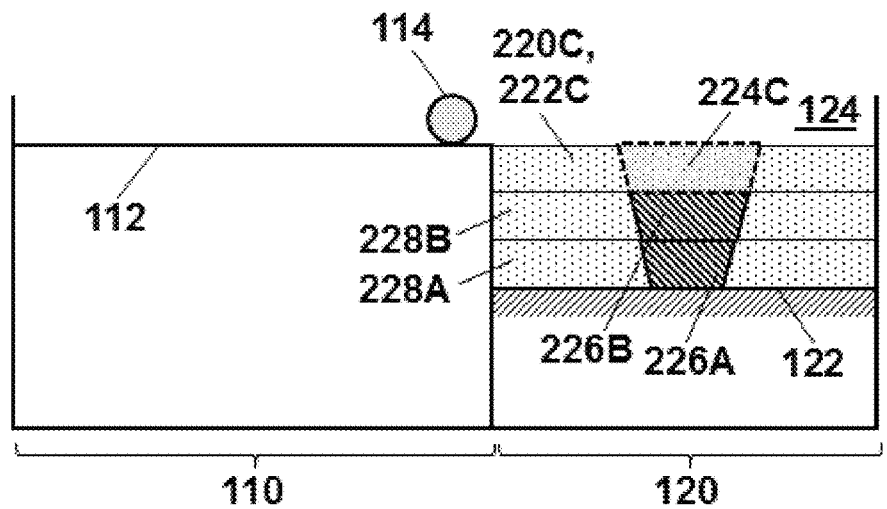
FIG. 1I is a side cross-sectional view illustrating a third step in an additive manufacturing method according to the disclosure (irradiating selected portion of suspension layer).
Figure 1J:
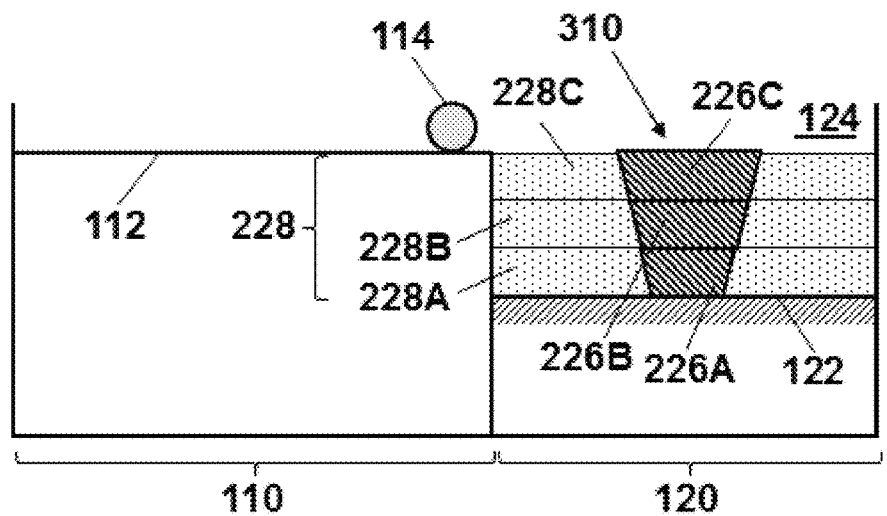
FIG. 1J is a side cross-sectional view illustrating a third step in an additive manufacturing method according to the disclosure (solid polymer layer).

Similarly, FIGS. 1H-1J illustrate a third step in the additive manufacturing method 200 analogous the second step discussed above. The print surface 122 along with the cured layers 226A, 226B and non-solid layers 228A, 228B are lowered to provide space for application of a third layer 220C with thickness $T_C$ of the metal particle suspension 210 to the print reservoir 124 (e.g., via the roller 114) and onto the underlying cured second layer 226B and non-solid second layer 228B (FIG. 1H). Irradiation and curing of a selected portion 224C of the third layer 220C then forms a corresponding cured third layer 226C (i.e., with the solid polymer matrix and metal particles therein) and non-solid third layer 228C (FIGS. 1I-1J). These application and curing steps can be repeated any number times as desired to build a final green part 310 (and eventual corresponding metal article 300) with the desired shape, size, geometry, etc. As illustrated in FIG. 1J for this representative three-step process, the final green part 310 includes the cured layers 226A, 226B, 226C (i.e., with the solid polymer matrix material and metal particles therein) bound together as a composite green part by the collective cured solid polymer portions or layers having a pre-selected overall shape/geometry based on the shape of the individual layers, with the metal particles being substantially homogeneously distributed throughout the polymer layers.

In some embodiments, an applied layer 220 (e.g., first, second, third, . . . layer 220A, 220B, 220C, . . . ) can be partially cured by UV radiation prior to (fully) curing a selected portion 224 (e.g., first, second, third, . . . selected portion 224A, 224B, 224C, . . . ) thereof. This is generally illustrated in FIGS. 1B-1J by partially cured layers 222A, 222B, 222C formed by partially curing the corresponding applied layers 220A, 220B, 220C. Such partial curing can include exposing a given applied layer (e.g., substantially the entire applied layer) to UV radiation for a sufficient time to partially cure the UV-curable polymeric resin in the liquid medium of the layer, thereby forming a partially cured layer including a partially cured polymer layer with the metal particles distributed throughout the partially cured polymer layer. After partial curing, the selected portion of the given layer can then be fully cured to form the cured layer with solid polymer and metal particles corresponding to the eventual green part 310.

The partially cured (intermediate) state generally does not have the networked or thermoset character of the fully cured, solid polymer formed by further UV exposure in only the selected portion of a given layer. Partial curing begins the polymerization process among monomers of the UV-curable polymeric resin, but only to a limited extent such that the partially cured layer is substantially entirely in a non-solid or non-fully cured form, for example an increased viscosity liquid or gel/semi-solid form, for example including a mixture of (i) uncured or lightly cured components in liquid or semi-liquid form and (ii) partially cured components solid or semi-solid form. In contrast to the fully cured polymer, which is essentially completely solid material (e.g., by weight), the partially cured resin typically includes at least some liquid materials and at least some solid materials. Partial curing can begin to create some polymer chains, but the UV-curable polymeric resin can retain at least some of its liquid character, but with an increased viscosity relative to the initial viscosity of the UV-curable polymeric resin in the as-applied metal particle suspension. By increasing the viscosity of the liquid medium in the partially cured layer, the settling velocity of metal particles in suspension is substantially reduced, thereby helping to maintain a homogeneous, well-mixed distribution of the metal particles in suspension, which in turn provides a homogeneous distribution of the metal particles in the eventual solid polymer layers and corresponding green part. Continuing the partial cure can increase the length and/or number of polymer chains, gradually forming a gel or semi-solid material that further limits settling velocity throughout the entire partially cured layer, but which is still easily removed from the eventual fully cured green part. Forming a gel or semi-solid material that is not fully cured also allows the ability to form overhang structures in which a newly applied layer is to have a selected portion and corresponding solid polymer layer that is larger than or is otherwise not directly supported underneath by the previous solid polymer layer, because the gel or semi-solid material from the previous layer is sufficient to support the newly applied layer.

Partial curing can be effected by using lower UV exposure times and/or lower UV exposure power/energy levels relative to those for full or complete curing. For example, partial curing can be performed by exposure to UV light for relatively short times depending on the mixture composition in terms of powder/particle size and powder/particle volume fraction, such as at least 0.1, 0.2, or 0.5 sec and/or up to 2, 5, 10, or 20 sec. Similarly, full curing can be performed by exposure to UV light for relatively longer times also depending on the mixture composition in terms of powder/particle size and powder/particle volume fraction, such as at least 10, 20, or 30 sec and/or up to 90, 180, 300, or 600 sec. In embodiments, partial curing can be performed by exposure to UV light at an exposure power/energy level that is at least 1, 2, 5, 10, 20, 30, 40, 50, 60, 70, or 80% and/or up to 15, 25, 35, 50, 65, 80, 90, 95, or 100% relative to the exposure power/energy level for full curing of the selected portion for a given layer. Suitably, partial curing is performed on substantially the entire (print) area of a given layer. For example, at least 80, 85, 90, 95, 98, or 99% and/or up 95, 98, 99, or 100% of the area of a given layer is partially cured before fully curing only a selected portion of the partially cured layer to form the corresponding solid polymer layer in the selected portion.

Metal Particle Suspensions and Layers

The metal particle suspension 210 and corresponding layers 220 (e.g., first, second, third, . . . layers 220A, 220B, 220C, . . . ) generally include a UV-curable polymeric resin liquid medium 212, metal particles 214 distributed throughout the liquid medium 212, and (optionally) a sintering aid 216 (e.g., sintering aid particles) distributed throughout the liquid medium 212. The suspension 210 and layers 220 generally have a high solids content (e.g., metal particle content) to provide the bulk material for the final sintered metal article 300, but also have a sufficient amount of the polymeric resin 212 to provide green part 310 structural integrity after curing, but before partial and full sintering. Description below related to amounts, components, etc. for the metal particle suspension 210 can apply similarly to an initially applied layer 220 thereof in the print bed reservoir 124.

In embodiments, the metal particle suspension contains the metal particles in an amount in a range of 60 wt. % to 99 wt. % or 80 wt. % to 99 wt. %. In embodiments, the metal particle suspension contains the UV-curable polymeric resin in an amount in a range of 1 wt. % to 20 wt. % or 1 wt. % to 20 wt. %. In various embodiments, the metal particle suspension can contain the metal particles in an amount of at least 60, 70, 75, 80, 85, 90, or 95 wt. % and/or up to 85, 90, 92, 95, 97, or 99 wt. %. In various embodiments, the metal particle suspension can contain the UV-curable polymeric resin in an amount of at least 1, 2, 5, 7, 10, 12, 15, or 20 wt. % and/or up to 8, 10, 12, 15, 20, 25, 30, or 40 wt. %. Alternatively or additionally, the metal particle suspension can be characterized in terms of the volume fraction of its components. For example, the metal particle suspension can contain 40-80 vol. % (or 50-65 vol. %) particles (e.g., all metal particles and any boron-containing particles or other sintering aid combined) and/or 20-60 vol. % (or 35-50 vol. %) liquid medium (e.g., UV-curable polymeric resin). In various embodiments, the metal particles account for 90 wt. % to 100 wt. % of the solid content of the metal particle suspension (i.e., excluding the liquid resin medium), for example being at least 90, 95, 98, 99, 99.9 wt. % and/or up to 95, 98, 99, 99.9 or 100 wt. % of the solid content in the suspension.

In embodiments, the metal particles include iron-containing particles, for example iron-containing metallic alloy particles. The iron-containing particles or powder can include iron-containing metallic alloy particles. Typical iron-containing particles can contain at least 50, 60, 70, 80, 90, or 95 wt. % iron and optionally one or more of carbon, manganese, aluminum, chromium, copper, nickel, molybdenum, silicon, vanadium. Examples of suitable iron-containing particles include steel and stainless steel metal particles, for example stainless steels SS316 and SS420. In some embodiments, the metal particles can include two or more types of metal particles, for example those which differ in composition (e.g., different metal compositions, whether iron-containing or otherwise) and/or differ in particle size/size distribution. Other materials and alloys based on metals other than iron are also possible. For example, other materials can include nickel, tungsten, or cobalt as primary metallic alloy components (e.g., at least 50, 60, 70, 80, 90, or 95 wt. % of the primary metal component with one or more of the above optional components). Particular examples include nickel-based super alloys such as AMDRY 386 and HAYNES 214, tungsten alloys, cobalt alloys, and high entropy alloys (HEA).

In embodiments, the metal particle suspension further includes boron-containing particles (or other sintering aid more generally). The boron-containing particles can serve as a sintering aid to improve the density, hardness, and/or finish of the final, sintered part. The boron-containing powder can include one or more of elemental boron particles (e.g., particles consisting of essentially only boron), boron carbide (BC) particles, and boron nitride (BN) particles. Sintering aids other than boron-containing powders can be used depending on the metal particles being sintered. For example, boron-containing materials such as B or BN are particularly useful sintering aids for iron-based metal particles such as various stainless steels, while Pd, Ni, and/or Pt are particularly useful sintering aids for tungsten-based metal particles. The boron-containing powder or other sintering aid is present in an amount from 0.01 wt. % to 5 wt. % relative to the metal particle suspension or the solid content thereof, for example being at least 0.01, 0.1, 0.2, 0.5, or 0.8 wt. % and/or up to 1, 1.2, 1.5, 2, 3, 4, or 5 wt. % in the metal particle suspension or solid content thereof, such as 0.2 wt. % to 2 wt. %. In various embodiments, the metal particles and boron-containing particles (or other sintering aid) combined account for 60 wt. % to 90 wt. % or 100 wt. % of the solid content of the metal particle suspension (i.e., excluding the liquid resin medium), for example being at least 60, 70, 80, 90, 95, 98, 99, 99.9 wt. % and/or up to 90, 95, 98, 99, 99.9 or 100 wt. % of the solid content in the suspension.

In embodiments, the metal particles have a particle size in a range from 1 μm to 200 μm. A particle size or size range can represent an average size or diameter (e.g., approximate or equivalent spherical diameter) of a particle size distribution, for example a number-, mass-, or volume-average size or diameter. A particle size or size range can alternatively or additionally represent lower and upper boundaries of a size particle size distribution, for example minimum/maximum particles sizes resulting from sieve cuts, 1%/99% sizes from a cumulative size distribution, 5%/95% sizes from a cumulative size distribution, etc. For example, the particle size of the metal particles can be at least 1, 2, 5, 10, 15, 20, 30, 40, 50, or 60 μm and/or up to 10, 20, 30, 40, 50, 60, 80, 100, 120, 150, or 200 μm. In some embodiments, the metal particle suspension can include two or more different types of metal particles having different size or size distribution characteristics, for example being formed from the same or different materials. For example, two different types of metal particles can have average sizes (number-, mass-, or volume-average sizes) in a ratio ranging from 1.5:1 to 10:1 (e.g., at least 1.5:1, 2:1, or 3:1 and/or up to 3:1, 5:1, 8:1, or 10:1 with the first powder having the larger average size). In another refinement, the boron-containing particles (or sintering aid more generally) have a particle size in a range from 0.01 μm to 20 μm (e.g., a number-, mass-, or volume-average size or diameter, such as at least 0.01, 0.1, 0.2, 0.5, or 1 μm and/or up to 1, 2, 3, 5, 10, or 20 μm, for example 0.1 μm to 3 μm or 0.2 μm to 2 μm). In another refinement, the metal particles and the boron-containing particles have average sizes (number-, mass-, or volume-average sizes) in a ratio in a range from 5:1 to 100:1 (e.g., at least 5:1, 10:1, 15:1, or 20:1, or 30:1 and/or up to 30:1, 50:1, 80:1, or 100:1 with the metal particles having the larger average size).

In embodiments, the UV-curable polymeric resin can include one or more of UV-curable polyesters, epoxies, urethanes, silicones, polyethers, and combinations thereof.

More generally, there are a wide variety of UV-curable polymeric resin known in the art, and those that can be used in the disclosed method are not particularly limited. General examples include (meth)acrylic-functionalized oligomers that can undergo free-radical polymerization and curing upon exposure to UV radiation, for example (meth)acrylated polyesters, (meth)acrylated epoxies, (meth)acrylated urethanes, (meth)acrylated silicones, and (meth)acrylated polyethers, in particular (meth)acrylated oligomers of the foregoing. Suitably, the UV-curable polymeric resin is curable upon exposure to UV radiation, but without the need for additional additives such as catalysts, (photo)initiators, etc.

In embodiments, the liquid medium has a viscosity at 20° C. or 25° C. in a range of 5 cP to 100 cP. The liquid medium and (correspondingly) the metal particle suspension as initially provided and applied as a layer suitably has a relatively low viscosity, which helps to ensure sufficient and even recoating of the underlying (cured) layer upon application of a new (uncured) layer. Partial curing of the initially applied low-viscosity fluid suspension can then increase viscosity and limit further settling within the evenly-applied layer. For example, the initial the UV-curable polymeric resin can have an initial viscosity in a range of 5-100 cP, 10-50 cP, or 10-20 cP, and/or the partially cured resin can have a viscosity that is at least 2, 4, 6, 10, 20, or 50 and/or up to 10, 20, 40, 60, 80, 100, 200, or 500 times the initial viscosity. The viscosity values can be measured at 20° C. or 25° C. with a suitable rheometer (e.g., determined at a shear rate of 0.1, 1, 10, 100, or 1000 $s^{-1}$ or at a value within a subrange thereof).

The applied layers 220 of the metal particle suspension 210 can have any suitable layer thickness T (e.g., first, second, third, . . . thicknesses $T_A$, $T_B$, $T_C$, . . . ) selected to balance factors such as cure depth, print speed, dimensional accuracy, spatial resolution of the printed part, etc. In embodiments, the applied layers can have a thickness in a range of 10 μm to 500 μm, which layers can have the same or different thicknesses relative to each other. For example, each applied layer independently can have a thickness of at least 10, 20, 30, 40, 50, 60, 80, 100, 120, 150, or 200 μm and/or up to 50, 75, 100, 125, 150, 200, 250, 300, 400, or 500 μm. Likewise, the applied layers can have metal particles with the same or different sizes/size distributions relative to each other. Often, the layer thickness will be determined and selected by curing depth and dimensional accuracy in view of the final desired article to be manufactured. Once a metal particle suspension composition is selected for the final article, the layer thickness is typically selected to be a fixed, consistent value throughout the process for a given article. The thickness between successive layers can be varied if desired, however, for example to provide structures with finer/smaller geometric scales in certain areas of the final article.

The thickness of a given layer is generally selected based on the size or size distribution of the metal particles in the applied metal particle suspension as well as the desired spatial resolution of the eventual green part. A larger layer thickness, for example at least 20 μm or 50 μm can be desirable to improve print speed by lessening the number of layers required to print a green part with a given total height. The thickness of a layer is limited, however, by the size/size distribution of the metal particles in the applied suspension: Relatively smaller metal particles generally increase scattering of UV radiation, thus limiting the ability of the UV radiation to penetrate past a certain distance within a layer while maintaining sufficient energy to initiate and cure the UV-curable polymeric resin. Thus, a maximum cure depth (or equivalently, a maximum layer thickness) is generally directly proportional to metal particle size: Smaller particles have more scattering and lower cure depths, while larger particles have less scattering and higher cure depths. As a counter to the scattering effect, the undesirable settling of metal particles in a layer after application increases with increasing size: Larger particles settle relatively more rapidly than smaller particles, possibly leading to an inhomogeneous, segregated spatial distribution of metal particles before full curing, which in turn results in an inhomogeneous metal particle distribution in the eventual green part and a misshapen final sintered part. This settling inhomogeneity for relatively larger particles is more pronounced in relatively thicker layers.

The competing effects between cure depth, layer thickness, and particle inhomogeneity are relatively pronounced for metal particles, meaning that additive manufacturing methods using a UV-curable binder for ceramic particle suspensions are not applicable to methods with metal particle suspensions. Ceramic particles are typically less dense and smaller (e.g., about 1 μm average size/diameter), but do not limit cure depth with such intense light scattering, meaning that thicker layers of ceramic particle suspensions can be applied without any appreciable sedimentation or segregation. In contrast, however, final sintered ceramic articles generally have a much lower density (e.g., up to about 90% maximum relative to theoretical density) than the final sintered metal articles according to the disclosure. The disclosed method for forming metal articles by additive manufacturing solves the problems with metal particle suspensions such that metal particle size and maximum cure depth/layer thickness are more freely selectable or controllable within larger ranges without substantial settling or segregation to cause metal particle inhomogeneity. Two means to address these problems include pre-mixing the metal particle suspension just prior to its application print bed, and partially curing the UV-curable polymeric resin of the full layer prior to full curing of only a selected portion of the layer. As a result, the disclosed method allows selection of relatively high metal particle sizes for correspondingly higher cure depths and layer thicknesses to increase printing speed. At the same time, the disclosed method also allows selection of relatively low metal particle sizes for correspondingly lower cure depths and layer thicknesses, which allows for finer spatial resolution for geometric features of the printed article (albeit at lower printing speeds for the higher-resolution parts or areas thereof).

As discussed above, the thickness of a given layer can be selected based on the size or size distribution of the metal particles in the applied metal particle suspension to balance factors related to light scattering, cure depth, particle segregation, etc. In some embodiments, one or more applied layers (or all applied layers) can have a thickness in a range of 50 μm to 100 μm (or at least 50 or 60 μm and/or up to 80 or 100 μm), and the metal particles can have a particle size in a range of 2 μm to 30 μm (or 5 μm to 20 μm). In some embodiments, one or more applied layers (or all applied layers) can have a thickness in a range of 100 μm to 200 μm (or at least 100 or 120 μm and/or up to 160 or 200 μm), and the metal particles can have a particle size in a range of 15 μm to 80 μm (or 20 μm to 60 μm). In some embodiments, one or more applied layers (or all applied layers) can have a thickness in a range of 200 μm to 500 μm (or at least 200 or 300 μm and/or up to 400 or 500 μm), and the metal particles can have a particle size in a range of 30 μm to 200 μm (or 40 μm to 100 μm). In some embodiments, a ratio of layer thickness divided by average metal particle size (e.g., number-, mass-, or volume-average size or diameter) in one or more applied layers (or all applied layers) can be in a range of 1.5 to 10 or 3 to 7, for example at least 1.5, 2, 2.5, 3, 3.5, 4, 4.5, 5, 5.5 or 6 and/or up to 4, 4.5, 5, 5.5, 6, 6.5, 7, 8, 9, or 10.

In embodiments, the metal particle suspension 210 can be formed/provided by mixing the UV-curable polymeric resin 212, the metal particles 214, and optionally the boron-containing particles or sintering aid 216 in the mixer 146 to form and homogenize the metal particle suspension 210 just prior to application of the metal particle suspension 210 as the first layer 220A and each subsequent layer 220B, 220C, etc. The mixer can be any suitable mixing apparatus, for example including an agitator, a dispensing outlet for the metal particle suspension, an inlet from a reservoir for particles (e.g., metal particles and optionally boron-containing particles), and an inlet from a reservoir for the UV-curable polymeric resin liquid medium. The mixer can continuously mix its contents so that the metal particle suspension is a homogenous, well-mixed suspension at the point when the suspension is applied as a layer in the print bed, for example being applied as a layer on a deposition area/surface, whereupon the layer is rolled, pushed, or otherwise transported to the adjacent print bed. This process reduces the amount of time available for metal particle settling in the applied layers before curing (or partial curing). For example, the mixture can be dispensed on the deposition surface so that it can be spread into a layer with a selected and consistent thickness (e.g., corresponding to the eventual layer in the reservoir), whereupon a scraper/roller or other suitable apparatus can be used to essentially immediately deliver the dispensed material on the deposition surface to the build surface in the reservoir.

Metal Articles

Figure 2A:
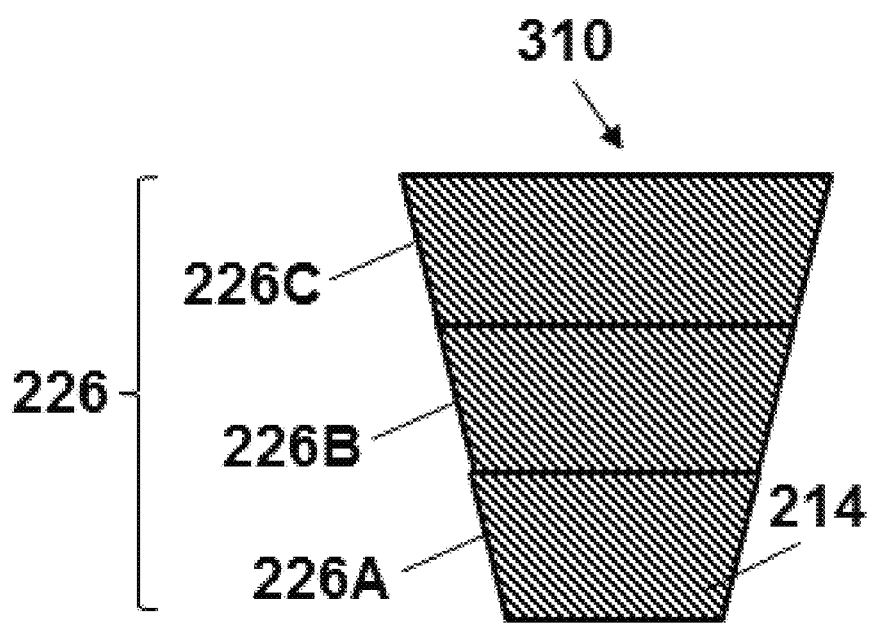
FIG. 2A is a side cross-sectional view illustrating a green part formed by an additive manufacturing method according to the disclosure.
Figure 2B:
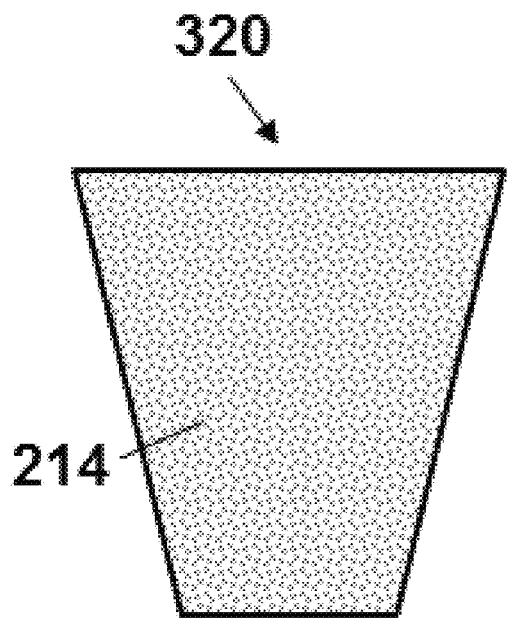
FIG. 2B is a side cross-sectional view illustrating a pre-sintered part formed by an additive manufacturing method according to the disclosure.
Figure 2C:
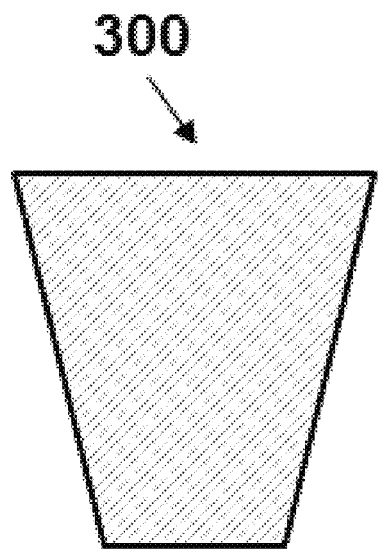
FIG. 2C is a side cross-sectional view illustrating a metal article (or sintered part) formed by an additive manufacturing method according to the disclosure.

FIGS. 2A-2C illustrate various metal-based articles formed according to the disclosed method 200, in particular including a green part 310, a pre-sintered or partially sintered part 320, and final metal article or sintered part 300.

The green part 310 as formed by the additive manufacturing method 200 is typically separated from the non-solid portions 228 of the metal particle suspension 210 remaining after application and curing of the various layers 220 (FIG. 1J). The non-cured or non-irradiated portions of the applied layers are generally in a non-solid or non-fully cured form, for example a liquid, a gel, or semi-solid form with the metal particles therein. When the non-cured or non-irradiated portions are substantially in liquid form, the solid green part can simply be withdrawn from the reservoir, optionally with some rinsing and/or drying to remove any residual UV-curable polymeric resin liquid medium and non-bound metal particles thereon, for example including metal particles not bound or otherwise immobilized by a cured polymeric matrix. When the non-cured or non-irradiated portions are substantially in gel or semi-solid form, the solid green part can be separated therefrom by wiping or otherwise mechanically removing a partially cured polymeric material and non-bound metal particles, washing or rinsing the solid green part with a suitable solvent for the partially cured or uncured material (but which would not be able to dissolve or otherwise remove the fully cured/crosslinked thermoset material forming the solid layer portions of the green part), etc.

In some embodiments, metal particles (and sintering aid particles when present) can be recovered and/or recycled from the non-solid portions 228 of the applied layers 220. For example, the non-fully cured portions of the polymer and metal particle mixture that are removed from the green part can be further processed to separate and recover the metal particles therein, which in turn allows recycling and reuse of the metal particles in the printing of a new, different metal article. For example, a suitable (organic) solvent (e.g., isopropanol or other lower C1-C4 alcohol) can be used to solvate/dissolve the non-fully cured polymer (i.e., which has not been fully cured to an insoluble thermoset), thus allowing the metal particles therein to settle and be collected.

The as-formed green part 310 includes the cured layers 226 (i.e., with the solid polymer matrix material and metal particles 214 therein) bound together as a composite green part by the collective cured solid polymer portions or layers having a pre-selected overall shape/geometry based on the shape of the individual layers, with the metal particles 214 being substantially homogeneously distributed throughout the polymer layers. In a typical debinding process, the green part 310 is first heated to a temperature sufficient to remove the solid polymer layers (i.e., a thermal debinding step), and partially, but not fully, sinter the metal particles, thereby forming a pre-sintered or partially sintered part 320. The pre-sintered or partially sintered part 320 includes pre-sintered metal particles 214 in substantially the same shape as that of the green part 310. The pre-sintered part 320 is then heated in a second heating step to a temperature sufficient to sinter (e.g., fully sinter or fuse) the metal particles 214, thereby forming a sintered part 300 (e.g., as the final metal article to be manufactured). The sintered part 300 includes sintered metal particles in a reduced-volume shape of the green part 310.

The final metal article 300 having a desired shape as a product of the additive manufacturing process 200 is generally formed by heating to remove the cured (or crosslinked/thermoset) portion of the green part 310 and to partially sinter the metal particles in the green part 310 in a first debinding step. Debinding generally includes applying heat and/or pressure a level and time sufficient to partially fuse (e.g., but not fully fuse or sinter) the metal particle/powder components of the green part 310 composition without substantial melting or liquid phase formation (e.g., necking or neck formation). Debinding can be performed in air or under an inert gas atmosphere (e.g., argon atmosphere) in order to avoid oxidation of the composition components during debinding. Debinding is suitably performed at a temperature sufficient to decompose/eliminate the cured polymeric binder from the green part model. After debinding to remove the polymer from the green part 310, the remaining pre-sintered part 320 is sintered in a second step to form the final metal article 300 by applying heat and/or pressure a level and time sufficient to fuse the metal particle/powder components of the green composition without substantial melting.

Debinding is performed at a temperature sufficient to decompose/eliminate the cured binder from the model, but less than a temperature sufficient to fully sinter the model. Depending on the material used for the polymeric resin, a debinding step to remove the cured polymer (or a debinding step) can be performed at a temperature in a range from 300° C. to 700° C. (e.g., 350-600° C. or 400-500° C.), for example at a temperature that is at least 200° C., 300° C., or 400° C. and/or up to 600° C., 800° C., or 1000° C. less than the eventual sintering temperature. At such decomposition temperatures, partial sintering of some metal particles occurs to a degree sufficient to maintain the shape of the debinded part even in the absence the cured binder (albeit at a low density and with low tensile strength properties), which allows the debinded part to be subsequently fully sintered at higher temperatures. The debinded or pre-sintered part 320 typically has the same overall shape and dimensions as the original green part, for example having characteristic linear dimensions in all three coordinate directions of at least 0.95, 0.98, or 0.99 and/or up to 0.98, 0.99, or 1 times that of the original green part.

Depending on the material used for the metal particles, the sintering step can be performed at a temperature in a range from 1000° C. to 1600° C., such as 1000-1400° C., 1100-1300° C. or 1150-1250° C. The sintered part 300 typically has a reduction in volume that results in substantially the same shape as the original green part (i.e., geometrically same or similar), but having smaller dimensions resulting from contraction upon sintering while filling in interstitial space among the metal particles. For example, the sintered part 300 can have characteristic linear dimensions in all three coordinate directions (or a shrinkage value) between 0.6 and 0.8, such as at least 0.6, 0.65, 0.7, 0.75, 0.8, 0.85, or 0.9 and/or up to 0.75, 0.8, 0.85, 0.9, or 0.95 times that of the original green part 310. The disclosed method retains geometric similarity between the green part 310 and the sintered part 300 with a controlled or selected degree of contraction between the two parts (i.e., and thus the ability to form the final metal article with controlled, desired dimensions) based on a well-mixed and homogeneous distribution of metal particles in the as-applied metal particle suspension 210, which in turn provides a homogeneous distribution of metal particles in the individual cured layers 226 and green part 310. Given a homogeneous distribution of metal particles 214 in the green part 310, the skilled artisan can determine using routine skill the relative contraction that will occur in all three coordinate directions upon sintering, thus allowing selection of an initial green part 310 with shape and dimensions that will yield a sintered part 300 with the desired shape and dimensions.

In embodiments, the final metal article or sintered part 300 has a density of at least 70% or 80% relative to the theoretical density of the metal particles 214 in the metal particle suspension 210. The theoretical density of the metal particles in the metal particle suspension is the density of a continuous, non-porous sample of the particle or other solid material in the initial metal particle suspension, for example taking into account multiple different types of metal particles, a possible boron-containing sintering aid, etc. In various embodiments, the sintered part can have a density of at least 70, 80, 85, 90, 95, or 98% and/or up to 90, 95, 98, 99, 99.5, or 100% of the theoretical density of the metal or otherwise solid material content initially in the metal particle suspension.

In some embodiments, the final metal article or sintered part 300 can be formed by pre-sintering two or more green parts 310 in a co-sintering process to form a single pre-sintered part 320, for example by pre-sintering the green parts 310 in contact with each other such that partial sintering during debinding to remove the cured polymer also partially fuses metal particles 214 from neighboring/touching green parts 310, thereby joining the originally separate green parts 310 into the single pre-sintered part 320. The originally separate green parts 310 can have the same or different geometries. The single pre-sintered part 320 can then be sintered as described above to form the corresponding final metal article or sintered part 300 with the desired shape. This process of joining multiple green parts together by co-sintering provides a means for creating complex geometries in applications that require creating enclosed channels and/or internal structures or features (e.g., walls, baffles, fins, blades, etc.) within a part. For example, a heat exchanger assembly with internal fin structures and heat flow channels can be formed by co-sintering two separate green heat changer plates together. Other representative geometrically complex and intricately tailored components include articles such as engine turbine blades, nuclear reactors, turbochargers, and heat exchangers. In particular for these and other high-temperature applications (e.g., where the final metal article 300 is intended to be used in a high-temperature setting), the metal particles 214 can be selected from high-temperature metals or alloys (e.g., other than steel or stainless steel), for example including nickel-based super alloys such as AMDRY 386 and HAYNES 214, tungsten alloys, cobalt alloys, and high entropy alloys (HEA).

EXAMPLES

The following examples illustrate the disclosed methods, compositions, and apparatus, but are not intended to limit the scope of any claims thereto.

Example 1

This example illustrates the disclosed additive manufacturing (AM) process which significantly improves the productivity of the current metal AM technologies by combining binder jet printing and stereolithography principles. Three dimensional objects can be printed on a powder bed system where photopolymerization takes place by selectively curing the suspensions containing metallic powder and ultraviolet curable resin in a layer-by-layer fashion. To improve the cure depth of metal suspensions, the effects of refractive index difference and particle size are evaluated so that such factors can be selected or controlled to achieve a suitable cure depth. Integration of a digital light projection module allows a high-speed production with dimensional accuracy within 100 mm. Printed parts are sintered at appropriate temperatures to attain metal parts with the final density above 97% and homogenous microstructure without residual stress.

Particle Size, Cure Depth, and Activation Energy

Three different sizes of stainless steel 420 (SS 420) powder were used to create three suspensions with the same powder volume fraction of 0.56, which is a typical particle loading fraction for metal SLA. Particle sizes of 106/45 µm, 55/22 µm, and 22/5 µm were used, where the first size represents the maximum particle size in the dispersion distribution, and the second size represents the minimum particle size in the dispersion distribution (e.g., where 106/45 µm represents maximum and minimum powder diameters of 106 µm and 45 µm, respectively). The UV curable resin used was CPS 3010 (available from Colorado Polymer Solutions, Denver, Colorado) with a room temperature (about 20° C. or about 25° C.) viscosity of 12 cP and an optimal curing wavelength of 405 nm. The suspensions were then spread to a single layer with controlled layer thickness on a powder bed system (FIG. 1A). The layer was sequentially exposed to a desired geometry with controlled UV energy dosage at the wavelength of 405 nm. Layer thicknesses of 50 µm, 100 µm, and 200 µm were tested with the various particle sizes above and UV energy dosages of 67.5 mJ/cm$^2$, 125 mJ/cm$^2$, and 187.5 mJ/cm$^2$, although the combination of 106/45 µm particle size and 50 µm layer thickness was not tested since the powder size exceeded the layer thickness. After the unexposed suspension was removed, the desired geometry was obtained (FIG. 2). During this series of tests, two important phenomena were observed: Photopolymerization occurred when the given energy dosage exceeded the suspension activation energy or critical energy ($E_c$). Plate adhesion occurred when the cure depth ($C_d$) exceeded the layer thickness.

For the 106/45 μm powder suspension, photopolymerization and plate adhesion were achieved at all layer thickness and energy dosage, indicating that the minimum $E_c$ is below 67.5 mJ/cm² and the maximum $C_d$ value is greater than 200 In the case of 55/22 m powder suspension, photopolymerization only occurred with the energy dosage of 187.5 mJ/cm² and plate adhesion was observed with 50 μm and 100 μm layer thicknesses. In the experiments with 22/5 μm powder suspension, no photopolymerization was achieved for the test layer thicknesses and energy dosages noted above, indicating that the $E_c$ value exceeded the maximum given energy dosage of 187.5 mJ/cm². A higher energy dosage 750 mJ/cm² was tested for the 22/5 μm powder suspension and photopolymerization took place, and plate adhesion was found at only 50 μm layer thickness. Table 1 below summarizes the results, which indicate that an increase in particle size corresponds to an increase in cure depth and a decrease in activation energy.

TABLE 1

Effect of Particle Size on Activation Energy and Cure Depth

| Particle Size (μm) | Activation Energy (mJ/cm²) | Cure Depth (μm) |
|---|---|---|
| 106/45 | $E_c < 67.5$ | $C_D > 200$ |
| 55/22 | $125 < E_c < 187.5$ | $100 < C_D < 200$ |
| 22/5 | $E_c \approx 750$ | $50 < C_D < 100$ |

Metal Additive Manufacturing Process

The results above illustrate the effect of particle size on photosensitivity properties of metal suspensions. By leveraging this effect and appropriately selecting metal particle size, a suitable cure depth can be obtained, allowing metal SLA to be used for metal fabrication.

One of the biggest advantages of SLA over other AM processes is its ability to generate large geometries efficiently. This can be achieved by layer projection with a digital light projection (DLP) module, which can significantly increase the fabrication speed, surpassing any point-by-point layer creation methods. Fabrication time in BJP and PBF is directly related to layer geometry, i.e. a large and complex geometry will take more time to be produced in comparison to a simple one. In contrast, SLA layer creation time is a constant value for every layer, regardless of layer geometry. For a large-scale fabrication system with complex layer geometry or multiple geometries, the use of SLA is advantageous. Also, PBF systems are difficult to employ on a large build area due to beam quality deterioration in the outer area of the print bed, and addition of a second laser or electron beam to increase build size results in an overly complex and expensive system.

A further advantage of SLA in fabricating metal parts lies in the nature of the process which allows decoupling of the printing process and powder consolidation process. In metal SLA, printed parts are consolidated isothermally, which results in a uniform final microstructure without residual stress. In contrast, the quality of the final parts made from PBF processes is unpredictable due to the complex microstructural evolution and variation throughout the fabrication process. Other advantages of metal SLA includes its affordability due to its design simplicity and the inexpensive suspension curing module. The process is also robust in fabricating green parts with virtually no limitation on powder material.

Similar to BJP, a typical drawback of metal SLA is a low final relative density. As described herein, however, the use of sintering aids (e.g., boron-based sintering aid particles such as BN particles) along with the primary metal power can further increase the final relative density of the sintered part to suitably high levels.

Additive Manufacturing Apparatus

A powder bed system as generally illustrated in FIG. 1A was constructed a build platform of 125 mm×125 mm. The mixing and dispensing module for the system was the Pressure Slurry Dispenser (available from Crist Instrument, Hagerstown, MD), which included a stirrer to provide a constant mixing of the media and deliver the consistent amount of suspension in a controlled pressure. The UV light source was a 3DLP9000 digital light projector (available from Digital Light Innovations). The 3DLP9000 is specifically designed for 3D printing purposes, providing high uniformity and low distortion to help maximize power delivered to the resin, utilizing an LED as the light source with the wavelength of 405 nm (i.e., in line with the peak curing wavelength of the resin used). The resolution of the UV light source is 100 μm at a maximum projection size of 192 mm×320 mm.

Green Part Fabrication

A turbine green part with 50 mm diameter and 20 mm height was successfully fabricated using SS 420 powder with size 55/22 μm. The suspension created has powder volume of 56.4% (87.5% powder wt. %). 200 layers were fabricated with a 100 μm layer thickness and a curing time of 40 s per layer.

During the fabrication process, significant segregation of metal powder within each suspension layer occurred in the uncured areas on the print bed, resulting in a layer of pure resin with significant thickness on top as the layers accumulates. This phenomenon compromised the suspension composition of the sequential layer deposited. In order to overcome this issue, a refined UV curing/projection strategy was implemented for each successive layer: The whole print area was first exposed to UV radiation for a short amount of time to turn the resin in the suspension into a quasi-solid state (e.g., partially curing the photopolymer resin and increasing its viscosity), which prevented substantial segregation of the suspension during the overall process. Subsequently, a selected portion of the print area (i.e., corresponding to the desired geometry of the given layer) was exposed to UV radiation for a time sufficient to fully consolidate the suspension therein (e.g., curing the photopolymer resin and immobilizing the metal particles therein in the selected portion of the print area). This scanning/irradiation strategy also allowed the fabrication of overhanging structures. The quasi-solid area now had sufficient structural strength to support the overhanging structures. In contrast, without the intermediate partial curing of the print area prior to full curing of the desired layer geometry, the uncured area remained a liquidus mixture that did not provide substantial support to a freshly applied suspension layer in overhanding areas. The turbine wings in the green part demonstrated the process's capability of fabricating overhanging structures.

Debinding and Sintering

In the debinding process, the resin is decomposed from the green part after going through an appropriate heating cycle. During this cycle, the powders also start to form necks among themselves, keeping the part in a desired shape while the resin is being removed. Thermogravimetric analysis (TGA) tests were carried out in order to determine the optimal heating cycle. Green samples were held at six different temperatures for 60 min and their weight losses over time were recorded. For 425° C., 450° C., and 475° C. heating temperatures, the green part weight percentages converged at 87.5%, which aligned with the initial composition of the metal in the suspension. However, for 450° C. and 475° C. heating temperatures, the weight percentage rose with time, indicating the oxidation of SS 420 powder. Therefore, the optimal debinding temperature was determined to be 425° C. The heating cycle was as follows: temperature was raised from room temperature (26° C.) to 425° C. at the ramping rate of 5° C./min, held in an isothermal stage for 1 h, and then cooled down to room temperature at 5° C./min.

Sintering for SS 420 was performed 1250° C., under vacuum environment with the pressure maintained at 1.33 Pa for 6 h, which minimized shrinkage and distortion while achieving a high final part density. Sintering was carried out in a high-temperature vacuum oven (G-3000; available from Materials Research Furnaces, Allenstown, NH).

Sintering Aids

In powder metallurgy, the addition of a small amount of sintering additive can enhance the sintering process. For the processing of SS 420 in particular, addition of 0.5% wt. % boron nitride (BN) in the base metal powder can improve final part quality in terms of density, hardness, and surface finish. After adding 0.5 wt. % BN into the 55/22 µm SS 420 suspension described above, a second turbine was fabricated to assess the application of sintering additives in the AM process. The density of the final part without sintering aids was 83%. Inclusion of sintering aids in the suspension improved final part density to 97.5%. Shrinkage of the final parts appeared to be uniform in all directions at 24% and 17% with and without BN additive, respectively. The process has demonstrated the capability to fabricate metal parts with high final density.

SUMMARY

In terms of green part fabrication speed, the disclosed AM system and method is superior in comparison to BJP. Fabrication time for a single layer using the disclosed AM system is 40 s, consisting of 15 s for curing and 25 s for metal powder suspension deposition and spreading on the 125 mm×125 mm print platform. For BJP, a minimum of 3 min is required to create a layer on a 40 mm×60 mm print platform. The total fabrication time to form the turbine part with the disclosed AM system is 9 h, including 2 h of green part fabrication and 7 h of debinding and sintering. Producing the same part on an SLM (ProX DMP200, Rock Hill, SC) or EBM (Arcam A2X, Boston, MA) system takes 6-8 h, including 4-6 h of machine preparation, and 2 h of fabrication time. However, it is important to note that the fabrication time for disclosed AM system is independent of layer geometry. In contrast BJP, SLM, and EBM will require a significantly longer time to fabricate a larger geometry part or multiple smaller geometry parts. A larger scale version of the disclosed AM system can be formed using a larger build platform in combination with multiple projection modules, which is relatively inexpensive for the DLP UV source (e.g., in comparison with a galvo-laser system).

Example 2

A green part and corresponding sintered part was formed using a substantially similar process to that described above for Example 1, but using a nickel-based alloy (HAYNES 214 superalloy) as the metal particles instead of the stainless steel particles in Example 1. The printed three-dimensional green objects were then subjected to appropriate thermal treatments under proper environmental conditions for binder removal and high temperature sintering to attain final metallic parts with relative density of above 99.5% with minimal oxidization.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

LIST OF COMPONENTS 100 additive manufacturing apparatus
110 deposition area
112 deposition surface
114 roller
120 print area
122 print surface
124 print bed reservoir
130 UV light source
132 UV radiation or light
140 metal particle suspension delivery system
142 first reservoir (metal particles)
144 second reservoir (UV-curable polymeric resin liquid)
146 mixer
150 computer system
200 additive manufacturing method
210 metal particle suspension
212 UV-curable polymeric resin liquid medium
214 metal particles
216 sintering aid (particles)
220 metal particle suspension layer with thickness/height T (A, B, C . . . for first, second, third, . . . layers)
222 partially cured metal particle suspension layer
224 selected portion of metal particle suspension layer
226 solid polymer (cured) layer or portion
228 non-solid layer or portion
300 metal article (sintered part)
310 green part
320 pre-sintered part

What is claimed is:

1. A method for forming a metal article by additive manufacturing, the method comprising:
providing a metal particle suspension comprising (i) a UV-curable polymeric resin liquid medium, (ii) metal particles distributed throughout the liquid medium, and (iii) optionally boron-containing particles selected from the group consisting of elemental boron particles, boron carbide particles, boron nitride particles, and combinations thereof; wherein: (A) a combined amount of the metal particles and any boron-containing particles present is at least 98 wt. % of total solid content in the metal particle suspension, and (B) when present, an amount of the boron-containing particles is at most 1 wt. % of total solid content in the metal particle suspension;
applying a first layer of the metal particle suspension into a reservoir;
exposing a selected portion of the first layer to UV radiation for a sufficient time to cure the UV-curable polymeric resin in the liquid medium of the selected portion of the first layer, thereby forming a cured first layer comprising a first solid polymer layer in the selected portion with the metal particles distributed throughout the first solid polymer layer;
applying a subsequent layer of the metal particle suspension into the reservoir and on a cured underlying layer;
exposing a selected portion of the subsequent layer to UV radiation for a sufficient time to cure the UV-curable polymeric resin in the liquid medium of the selected portion of the subsequent layer, thereby forming a cured subsequent layer comprising a subsequent solid polymer layer in the selected portion with the metal particles distributed throughout the subsequent solid polymer layer; and
repeating application and curing of a subsequent layer of the metal particle suspension a plurality of times to form a plurality of cured subsequent layers and subsequent solid polymer layers, thereby forming a green part comprising the solid polymer layers with the metal particles therein.

2. The method of claim 1, further comprising:
separating the green part from non-solid portions of the first layer and the subsequent layers.

3. The method of claim 1, further comprising:
recovering metal particles from the non-solid portions of the first layer and the subsequent layers.

4. The method of claim 1, further comprising:
heating the green part to a temperature sufficient to (i) remove the solid polymer layers, and (ii) partially, but not fully, sinter the metal particles, thereby forming a pre-sintered part comprising pre-sintered metal particles in the shape of the green part; and
heating the pre-sintered part to a temperature sufficient to sinter the metal particles, thereby forming a sintered part comprising sintered metal particles in a reduced-volume shape of the green part.

5. The method of claim 1, wherein the sintered part has a density of at least 80% relative to the theoretical density of the metal particles in the metal particle suspension.

6. The method of claim 1, further comprising:
after applying the first layer and before exposing the selected portion of the first layer to UV radiation, exposing the first layer to UV radiation for a sufficient time to partially cure the UV-curable polymeric resin in the liquid medium of the first layer, thereby forming a partially cured first layer comprising a first partially cured polymer layer with the metal particles distributed throughout the first partially cured polymer layer; and
after applying each subsequent layer and before exposing the selected portion of each subsequent layer to UV radiation, exposing each subsequent layer to UV radiation for a sufficient time to partially cure the UV-curable polymeric resin in the liquid medium of each subsequent layer, thereby forming a partially cured subsequent layer comprising a subsequent partially cured polymer layer with the metal particles distributed throughout the subsequent partially cured polymer layer.

7. The method of claim 1, wherein the UV radiation has a peak wavelength in a range of 315 nm to 405 nm.

8. The method of claim 1, wherein:
the metal particle suspension contains the metal particles in an amount in a range of 80 wt. % to 99 wt. %; and
the metal particle suspension contains the UV-curable polymeric resin in an amount in a range of 1 wt. % to 20 wt. %.

9. The method of claim 1, wherein the metal particles comprise iron-containing particles.

10. The method of claim 1, wherein:
the metal particle suspension comprises the boron-containing particles; and
the boron-containing particles are present in an amount of 0.01 wt. % to 1 wt. % of total solid content in the metal particle suspension.

11. The method of claim 1, wherein the metal particles have a number-, mass-, or volume-average particle size in a range from 15 μm to 200 μm.

12. The method of claim 1, wherein the UV-curable polymeric resin is selected from the group consisting of UV-curable polyesters, epoxies, urethanes, silicones, polyethers, and combinations thereof.

13. The method of claim 1, wherein the liquid medium has a viscosity at 25° C. in a range of 5 cP to 100 cP.

14. The method of claim 1, wherein:
the applied first layer has a thickness in a range of 10 μm to 500 μm; and/or
each applied subsequent layer has a thickness in a range of 10 μm to 500 μm.

15. The method of claim 1, wherein:
at least one of the applied first layer and each applied subsequent layer has a thickness in a range of 50 μm to 100 μm; and
the metal particles have a particle size in a range of 2 μm to 30 μm.

16. The method of claim 1, wherein:
at least one of the applied first layer and each applied subsequent layer has a thickness in a range of 100 μm to 200 μm; and
the metal particles have a particle size in a range of 15 μm to 80 μm.

17. The method of claim 1, wherein:
at least one of the applied first layer and each applied subsequent layer has a thickness in a range of 200 μm to 500 μm; and
the metal particles have a particle size in a range of 30 μm to 200 μm.

18. The method of claim 1, wherein providing the metal particle suspension comprises: mixing (i) the UV-curable polymeric resin, (ii) the metal particles, and optionally (iii) boron-containing particles in a mixer to form and homogenize the metal particle suspension just prior to application of the metal particle suspension as the first layer and each subsequent layer.

19. The method of claim 1, wherein the metal particles comprise metal alloy particles.

20. The method of claim 19, wherein the metal alloy particles comprise:
- at least 50 wt. % relative to the metal alloy particles of a primary metal component selected from the group consisting of iron, nickel, tungsten, and cobalt; and
- one or more additional components which are (i) different from the primary metal component and (ii) selected from the group consisting of carbon, manganese, aluminum, chromium, copper, nickel, molybdenum, silicon, vanadium, and combinations thereof.

* * * * *